(12) United States Patent
Shinozaki et al.

(10) Patent No.: US 7,296,857 B2
(45) Date of Patent: Nov. 20, 2007

(54) VEHICLE SEAT RECLINING DEVICE

(75) Inventors: Katsuhiko Shinozaki, Tochigi (JP);
Takuro Yamada, Tochigi (JP);
Masaharu Machii, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 29 days.

(21) Appl. No.: 10/520,329

(22) PCT Filed: Jul. 7, 2003

(86) PCT No.: PCT/JP03/08614

§ 371 (c)(1),
(2), (4) Date: Aug. 31, 2005

(87) PCT Pub. No.: WO2004/004517

PCT Pub. Date: Jan. 15, 2004

(65) Prior Publication Data

US 2006/0125302 A1 Jun. 15, 2006

(30) Foreign Application Priority Data

Jul. 5, 2002 (JP) .............................. 2002-197294
Jun. 4, 2003 (JP) .............................. 2003-158913

(51) Int. Cl.
*B60N 2/02* (2006.01)
(52) U.S. Cl. ........................ 297/365; 297/363; 297/364
(58) Field of Classification Search ................. 297/363, 297/364, 365, 373; 403/93, 109.6, 378, 379.5, 403/322.4, 321, 324; 16/330, 303, 321, 324, 16/326, 327

See application file for complete search history.

(56) References Cited

U.S. PATENT DOCUMENTS

| | | | | | |
|---|---|---|---|---|---|
| 1,224,982 | A | * | 5/1917 | Washeim | 297/365 |
| 1,234,402 | A | * | 7/1917 | Simmers | 297/363 |
| 3,784,252 | A | * | 1/1974 | Peterson | 297/364 |
| 4,236,753 | A | * | 12/1980 | Ooshiro et al. | 297/364 |
| 4,770,559 | A | * | 9/1988 | Yoo | 403/93 |
| 4,773,704 | A | * | 9/1988 | Engels | 297/362 |
| 5,265,969 | A | * | 11/1993 | Chuang | 403/94 |
| 5,395,154 | A | * | 3/1995 | Wang | 297/130 |
| 5,496,092 | A | * | 3/1996 | Williams et al. | 297/250.1 |
| 5,524,970 | A | * | 6/1996 | Kienke et al. | 297/362 |
| 5,685,610 | A | * | 11/1997 | Minai | 297/364 |
| 6,185,769 | B1 | * | 2/2001 | Larisey et al. | 5/648 |

(Continued)

*Primary Examiner*—Sarah B McPartlin
(74) *Attorney, Agent, or Firm*—Dann, Dorfman, Herrell and Skillman, P.C.

(57) ABSTRACT

A recliner device includes a locking pin (4), an operating knob (70) having a boss portion (70a) and a substantially cylindrical portion (70b) coaxial with the boss portion (70a), the substantially cylindrical portion (70b) surrounding the locking pin (4), a first bracket having notches (1a-1c), the locking pin (4) penetrating the first bracket so as to be axially movable and being releasably engaged with any one of the notches (1a-1c), a receiving base (9, 90) mounted on a second bracket (2) so as to be opposed to the substantially cylindrical portion (70b), and cam surfaces (10, 20) formed on an edge of the substantially cylindrical portion (70b) and an edge of the receiving base (9, 90) which are opposed to each other, each of the cam surfaces (10, 20) having a height enough to allow the locking pin to be axially movable, and the locking pin (4) being adapted to be disengaged from the one of the notches (1a-1c) by rotating the operating knob (70).

10 Claims, 20 Drawing Sheets

U.S. PATENT DOCUMENTS

| | | |
|---|---|---|
| 6,565,156 B1 * | 5/2003 | Yamashita et al. ..... 297/354.12 |
| 6,685,266 B2 * | 2/2004 | James et al. ............ 297/250.1 |
| 6,719,372 B2 * | 4/2004 | Glaspie et al. .............. 297/373 |
| 7,085,375 B2 * | 8/2006 | Katoh ................... 379/433.13 |

* cited by examiner

PRIOR ART

PRIOR ART

PRIOR ART

PRIOR ART

PRIOR ART

_US 7,296,857 B2_

VEHICLE SEAT RECLINING DEVICE

FIELD OF THE INVENTION

This invention relates to a recliner device for a vehicle seat, which allows a seat back of the vehicle seat to be pivoted relative to a seat cushion of the vehicle seat and, more particularly, to an improvement of a recliner device for allowing an attitude of the seat back to be selectively changed to a vertically standing posture, a forwardly inclined posture or a rearwardly inclined posture relative to the seat cushion.

BACKGROUND OF THE INVENTION

Referring now to FIGS. 1 to 5, a conventional recliner device for a vehicle seat will be discussed hereinafter in order to facilitate understanding of the present invention. As shown in FIG. 1, the conventional recliner device generally includes first brackets 1 provided at both sides of a seat back B of the vehicle seat and extending downwardly from the both sides of the seat back B, and second brackets 2 provided at both sides of a seat cushion C of the vehicle seat and extending rearwardly from the both sides of the seat cushion C. As shown in FIG. 2, the first brackets 1 (only one first bracket 1 is shown in FIG. 2) pivotally connected to the second brackets 2 (only one second bracket 2 is shown in FIG. 2) by causing lower end portions of the first brackets 1 to be disposed on inner surfaces of rear end portions of the second brackets 2 and causing the lower end portions of the first brackets 1 to be coupled to the rear end portions of the second brackets 2 by means of supporting pins 3 (only one supporting pin 3 is shown in FIG. 2), so that the seat back B can be pivoted around the supporting pins 3 relative to the seat cushion C, that is, an attitude of the seat back B can be selectively changed to a vertically standing posture, a forwardly inclined posture or a rearwardly inclined posture.

As shown in FIGS. 3 to 5, the conventional recliner device further includes a locking pin 4 which penetrates one of the second brackets 2 so as to be axially movable, and extends towards a lower end edge of corresponding one of the first brackets 1. The lower end edge of the first bracket 1 is formed in a substantially semicircular shape and has three engaging notches 1a, 1b, 1c disposed at predetermined circumferential intervals around the supporting pin 3. An inner end portion 4a of the locking pin 4 is releasably engaged with any one of the engaging notches 1a-1c of the first bracket 1 by an action of a coil spring discussed hereinafter, whereby the seat back B can be selectively locked in the vertically standing posture, the forwardly inclined posture or the rearwardly inclined posture with respect to the seat cushion C. The conventional recliner device is disclosed in Japanese Patent Application Laid-Open No. Hei. 9-117339.

As shown in FIGS. 4 and 5, the locking pin 4 is provided with a circumferential flange 4b. A substantially cylindrical pin-holder 5 is fixed on an outer surface of the second bracket 2 and surrounds the locking pin 4. An outer end portion 4c of the locking pin 4 projects outwardly from the pin-holder 5. The pin-holder 5 has an inwardly facing circumferential flange portion 5a. The coil spring 6 briefly discussed above is mounted around the locking pin 4 and disposed between the circumferential flange 4b of the locking pin 4 and the inwardly facing circumferential flange portion 5a of the pin-holder 5. Due to an action of the coil spring 6, the locking pin 4 is always urged toward the first bracket 1 and the inner end portion 4a of the locking pin 4 is releasably engaged with any one of the notches 1a-1c of the first bracket 1. An operating knob 7 is movably mounted on the pin holder 5 and fastened to the outer end portion 4c of the locking pin 4 by a screw 8.

In the conventional recliner device, when the operating knob 7 is drawn against the action of the coil spring 6 by a person in such an axial direction as to be away from the first bracket 1 as indicated by an arrow in FIG. 5, the locking pin 4 is drawn in the same direction, whereby the locking pin 4 is disengaged from the one of the engaging notches 1a-1c with which the locking pin 4 has been engaged until now. Thus, the seat back is brought into a condition where the seat back is allowed to be pivoted relative to the seat cushion. However, in order that the locking pin 4 can be positively disengaged from the engaging notch against the action of the coil spring 6, the person must draw the operating knob 7 with a considerable pulling-force. Therefore, it is hard for physically weak persons such as aged persons and children to operate the operating knob.

SUMMARY OF THE INVENTION

The present invention has been made with a view to overcoming the foregoing problem of the prior art recliner device.

It is therefore an object of the present invention to provide a recliner device which everybody in a broad age-group including physically weak persons such as aged persons and children can easily handle.

In accordance with the present invention, there is provided a recliner device for a vehicle seat. The vehicle seat comprises a seat back and a seat cushion. The recliner device comprises a first bracket provided at a side of the seat back and extending downwardly from the side of the seat back, the first bracket having a lower end portion, a second bracket provided at a side of the seat cushion and extending rearwardly from the side of the seat cushion, the second bracket having a rear end portion, the first bracket being pivotally connected at the lower end portion thereof to the rear end portion of the second bracket by means of a supporting pin with the lower end portion thereof being overlapped on the rear end portion of the second bracket, whereby the seat back is pivotable around the supporting pin in such a manner that an attitude of the seat back is changed to a vertically standing posture, a forwardly inclined posture or a rearwardly inclined posture relative to the seat cushion, the lower end portion of the first bracket having spaced apart notches formed at a circumferential edge thereof so as to be coaxial with the supporting pin, a locking pin having an inner end portion and an outer end portion, the locking pin penetrating the rear end portion of the second bracket so as to be axially movable and protruding toward the circumferential edge of the lower end portion of the first bracket, a spring mounted around the locking pin for urging the locking pin toward the circumferential edge of the lower end portion of the first bracket and causing the inner end portion of the locking pin to be engaged with any one of the notches, to thereby allow the seat back to be maintained in the vertically standing posture, the forwardly inclined posture or the rearwardly inclined posture, a receiving base mounted on an outer surface of the rear end portion of the second bracket and coaxially surrounding the locking pin, an operating means mounted to the outer end portion of the locking pin so as to be opposed to the receiving base, and cooperating cam surface means on the operating means and the receiving base. When the operating means is rotated relative to the receiving base, the locking pin is axially moved away from the circumferential edge of the lower end portion of the first bracket and then disengaged from the one of the notches with which the inner end portion of the locking pin has been engaged until now, whereby the seat back is allowed to be pivoted around the supporting pin.

In a preferred embodiment according to the present invention, the operating means may comprise an operating knob having a substantially cylindrical section, the receiving base may be formed into a substantially ring-shape, and the cooperating cam surface means may comprise a first cam surface formed on a circumferential edge of the substantially cylindrical section which is opposed to a circumferential edge of the substantially ring-shaped receiving base, and a second cam surface formed on the circumferential edge of the substantially ring-shaped receiving base. Each of the first and second cam surfaces may comprise two spaced apart crest portions and two spaced apart valley portions which are adapted to be releasably engaged with each other. Each of the crest portions has a height enough to allow the locking pin to be axially moved so as to be disengaged from the one of the notches of the first bracket.

The first and second cam surfaces have the same shape. The first cam surface may comprise first and second crest portions spaced apart at intervals of about 180 degrees around the circumferential edge of the substantially cylindrical section, and first and second spaced apart valley portions each being disposed between the first and second crest portions and continuously connected to the first and second crest portions. The second cam surface may comprise third and fourth crest portions spaced apart at intervals of about 180 degrees around the circumferential edge of the substantially ring-shaped receiving base, and third and fourth spaced apart valley portions each being disposed between the third and fourth crest portions and continuously connected to the third and fourth crest portions. The first and second crest portions and the third and fourth crest portions are adapted to be releasably engaged with the third and fourth valley portions and the first and second valley portions, respectively.

The first cam surface may comprise first and second axially extending surfaces spaced at intervals of about 180 degrees around the circumferential edge portion of the substantially cylindrical section, a first circumferentially sloping surface descending from a tip edge of the first axially extending surface to a root point of the second axially extending surface, and a second circumferentially sloping surface descending from a tip edge of the second axially extending surface to a root point of the first axially extending surface. The second surface may comprise third and fourth axially extending surface spaced at intervals of about 180 degrees around the circumferential edge portion of the ring-shaped receiving base, a third circumferentially sloping surface descending from a tip edge of the third axially extending surface to a root point of the fourth axially extending surface, and a fourth circumferentially sloping surface descending from a tip edge of the fourth axially extending surface to a root point of the third axially extending surface.

The circumferentially sloping surfaces formed on one of the operating knob and the receiving base may have lengths shorter than lengths of the circumferentially sloping surfaces formed on the other of the operating knob and the receiving base. The axially extending surfaces formed on the one of the operating knob and the receiving base may be provided at their tip edges with stopper projections.

The receiving base may comprise a substantially plate-shaped body having a ring-shaped receiving portion. The substantially plate-shaped body is fixed on the outer surface of the rear end portion of the second bracket with the ring-shaped receiving portion surrounding the locking pin. The cooperating cam surface means may comprise a first cam surface formed on a circumferential edge of the substantially cylindrical section which is opposed to a circumferential edge of the ring-shaped receiving portion, and a second cam surface formed on the circumferential edge of the ring-shaped receiving section. Each of the first and second cam surfaces may comprise two spaced apart crest portions and two spaced apart valley portions which are adapted to be releasably engaged with each other. Each of the crest portions has a height enough to allow the locking pin to be axially moved so as to be disengaged from the one of the notches of the first bracket. The first and second crest portions are spaced apart at intervals of about 180 degrees around the circumferential edge of the substantially cylindrical section. Each of the first and second spaced apart valley portions is disposed between the first and second crest portions and continuously connected to the first and second crest portions. The third and fourth crest portions are spaced apart at intervals of about 180 degrees around the circumferential edge of the ring-shaped receiving portion. Each of the third and fourth spaced apart valley portions is disposed between the third and fourth crest portions and continuously connected to the third and fourth crest portions.

The operating knob may have a boss portion coaxial with the substantially cylindrical portion. The boss portion may be provided with an axially protruding piece. One of an inner surface of the axially protruding piece and an outer surface of the ring-shaped receiving portion may be formed with at least one linear groove. The other of the inner surface of the axially protruding piece and the outer surface of the ring-shaped receiving portion may be provided with at least one projection. The at least one groove and the at least one projection is adapted to be releasably engaged with each other.

The plate-shaped body of the receiving base may have a dowel provided on a back side thereof and projecting from the bottom surface. The second bracket may have a dowel hole formed in the rear end portion thereof. The dowel of the receiving base is fitted in the dowel hole of the second bracket.

MODES FOR CARRYING OUT THE INVENTION

Figure 1:
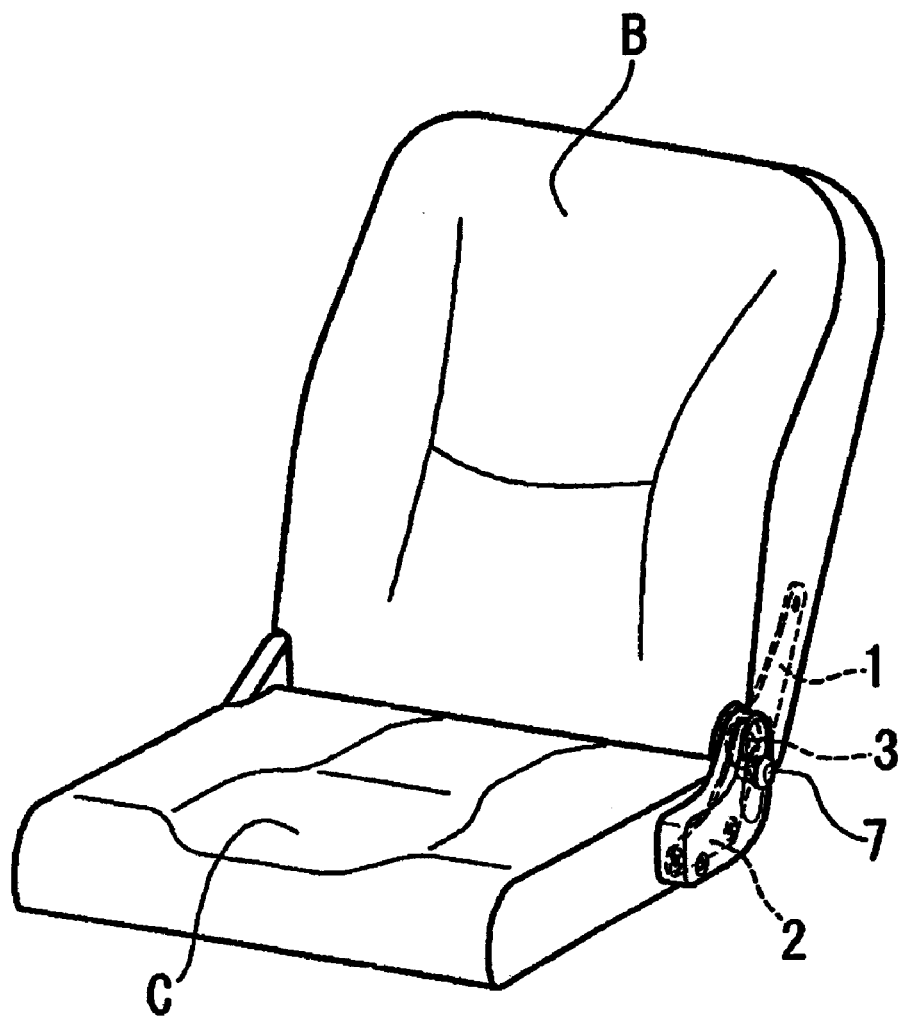
FIG. 1 is a schematic perspective view of a vehicle seat provided with a conventional recliner device.
Figure 2:
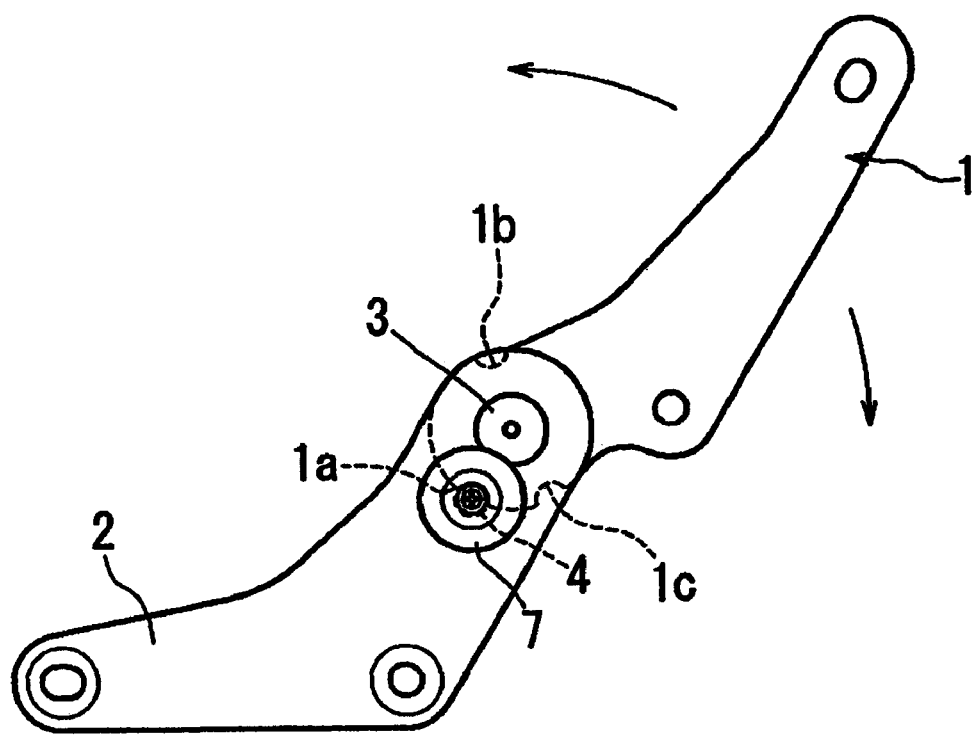
FIG. 2 is a schematic side view of the conventional recliner device.
Figure 3:
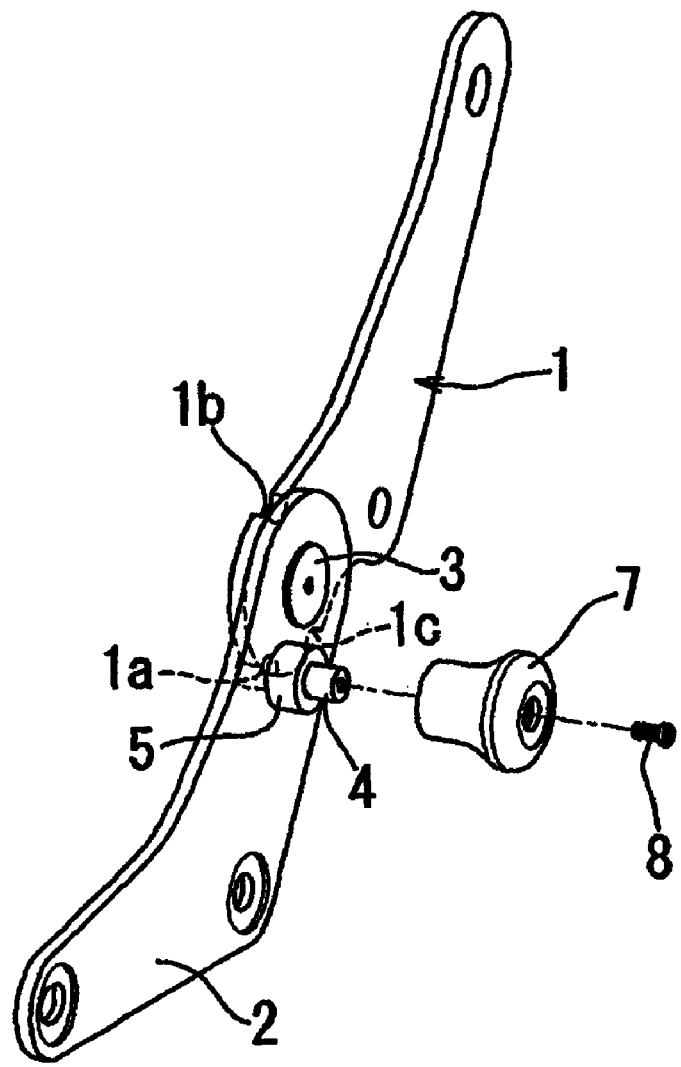
FIG. 3 is a schematic exploded perspective view of the recliner device shown in FIG. 2.
Figure 4:
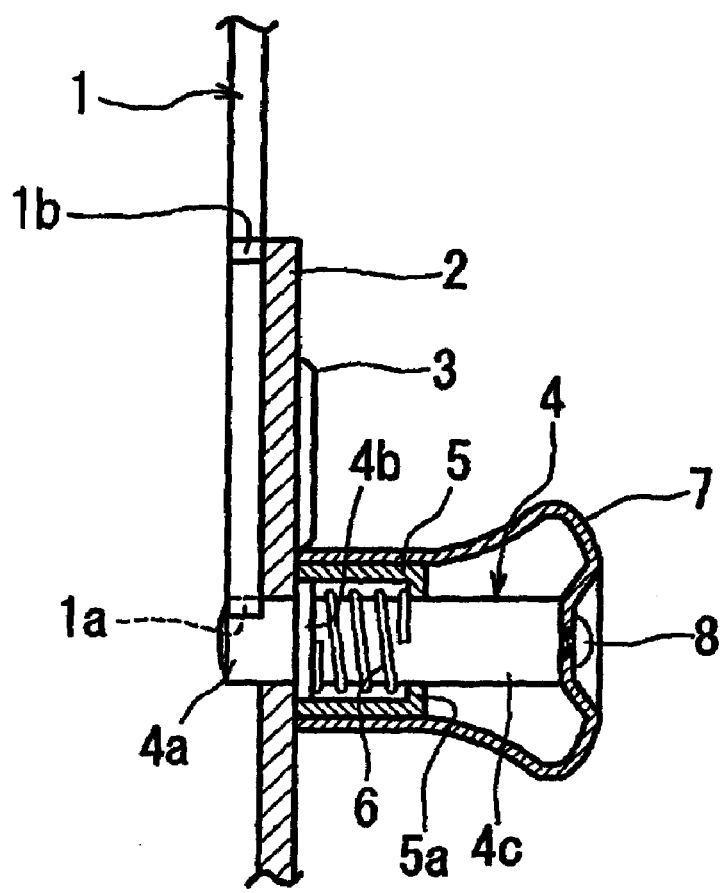
FIG. 4 is a schematic sectional view of the recliner device of FIG. 2 in a usual condition.
Figure 5:
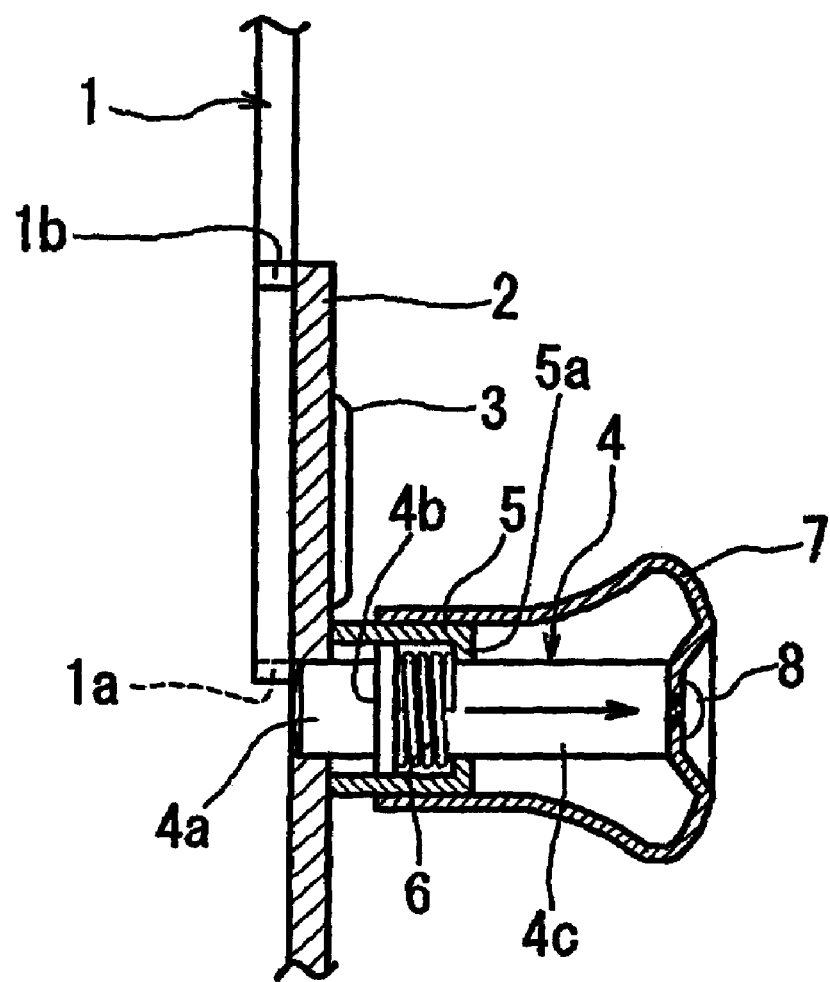
FIG. 5 is a schematic sectional view of the recliner device of FIG. 2 in an operated state.

A description will be given of embodiments with reference to FIGS. 6 to 21. In Figures, the same components of the illustrated embodiments are denoted by like reference numerals. Each of the embodiments according to the present invention is to be applied to a left side of such a vehicle seat as shown in FIG. 1, e.g., a rear seat for a wagon car.

Referring now to FIGS. 6 to 10, a recliner device for a vehicle seat according to a first embodiment of the present invention will be discussed hereinafter.

Figure 6:
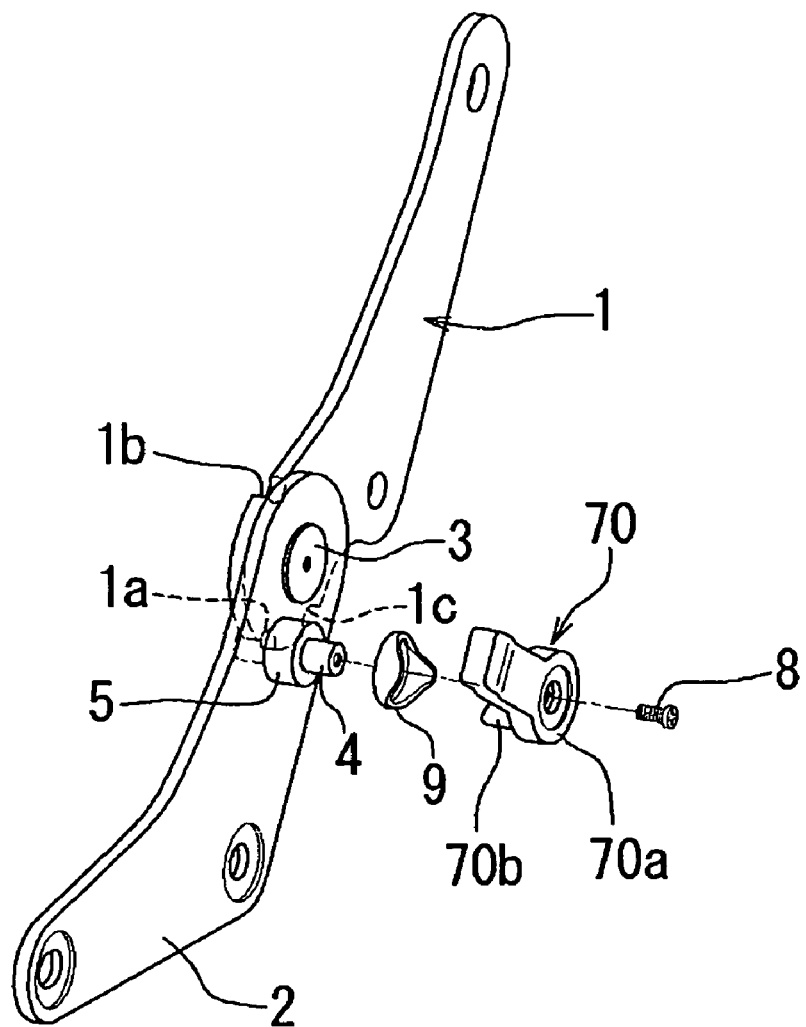
FIG. 6 is a schematic exploded perspective view of a recliner device according to a first embodiment of the present invention.

As shown in FIG. 6, the recliner device according to the first embodiment of the present invention includes a first bracket 1 provided at a left side of a seat back of the vehicle seat and extending downwardly from the left side of the seat back, and a second bracket 2 provided at a left side of a seat cushion of the vehicle seat and extending rearwardly from the left side of the seat cushion. In the illustrated example, the first bracket 1 is employed as an inner bracket and the second bracket 2 is employed as an outer bracket. More particularly, a lower end portion of the first bracket 1 is disposed or overlapped on an inner surface of a rear end portion of the second bracket 2 and pivotally connected to the rear end portion of the second bracket 2 by means of a supporting pin 3. Similarly, a third bracket and a fourth bracket (not shown) are provided at a right side of the seat back and a right side of the seat cushion, respectively. The third bracket is pivotally connected to the fourth bracket by a supporting pin (not shown) in the same manner as the first bracket 1 is pivotally connected to the second bracket 2 by the supporting pin 3.

The seat back is pivoted around the supporting pins relative to the seat cushion in the same manner as the seat back shown in FIG. 1 is done. That is, an attitude of the seat back can be selectively changed to a vertically standing posture, a forwardly inclined posture or a rearwardly inclined posture relative to the seat cushion. A locking pin 4 penetrates the second bracket 2 so as to be axially movable, and extends towards a lower end edge of the first bracket 1. A lower end portion of the first bracket 1 is formed into a substantially semicircular shape and has three engaging notches 1a, 1b, 1c of substantially semicircular-shapes disposed at predetermined circumferential intervals of the lower end edge of the first bracket 1 around the supporting pin 3. An inner end portion 4a of the locking pin 4 is releasably engaged with any one of the engaging notches 1a-1c of the first bracket 1 by an action of a coil spring discussed in greater detail hereinafter, whereby the seat back can be selectively locked in the vertically standing posture, the forwardly inclined posture or the rearwardly inclined posture relative to the seat cushion.

Figure 7:
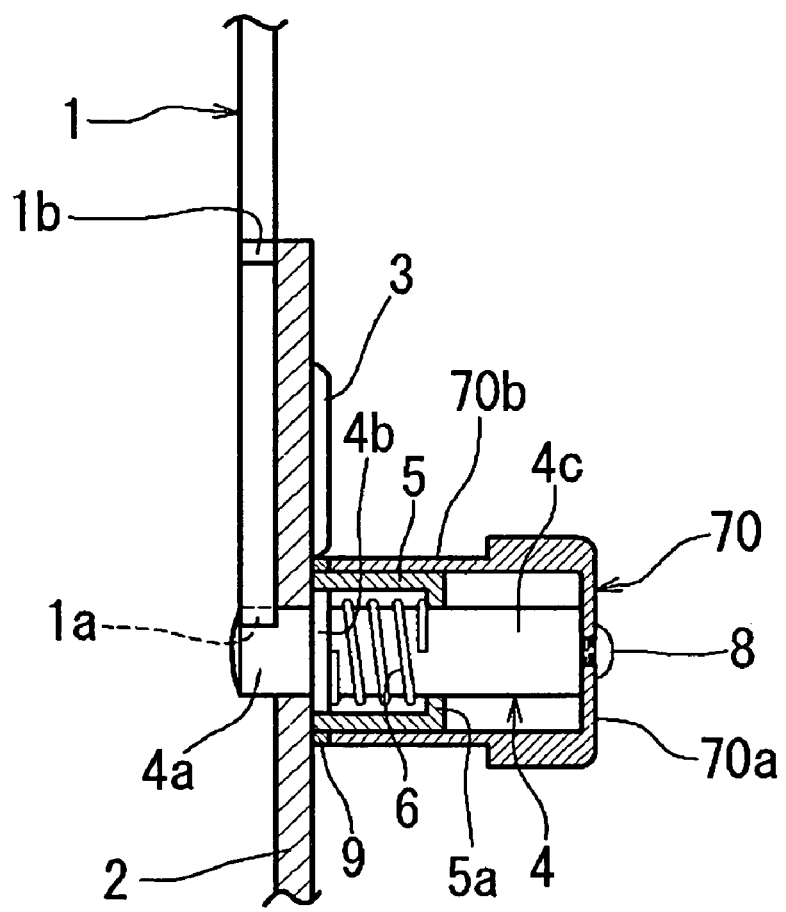
FIG. 7 is a schematic sectional view of the recliner device of FIG. 6 in an assembled condition.

Referring to FIG. 7, a receiving base 9 of a substantially ring-shape is fixed on an outer surface of the rear end portion of the second bracket 2 and coaxially surrounds the locking pin 4. The locking pin 4 is provided with a circumferential flange 4b. A substantially cylindrical pin-holder 5 is mounted in the receiving base 9 so as to coaxially surround the locking pin 4, and fixed on the outer surface of the second bracket 2. An outer end portion 4c of the locking pin 4 projects outwardly from the pin-holder 5. The pin-holder 5 has an inwardly facing circumferential flange portion 5a. The coil spring 6 briefly discussed above is mounted around the locking pin 4 and disposed between the circumferential flange 4b of the locking pin 4 and the inwardly facing circumferential flange portion 5a of the pin-holder 5, whereby the locking pin 4 is always urged in such an axial direction as to be operatively engaged with any one of the engaging notches 1a-1c of the first bracket 1. An operating knob 70 is rotatably mounted on the pin-holder 5 in a face-to-face relationship with the receiving base 9 as will be discussed in greater detail hereinafter.

Figure 8:
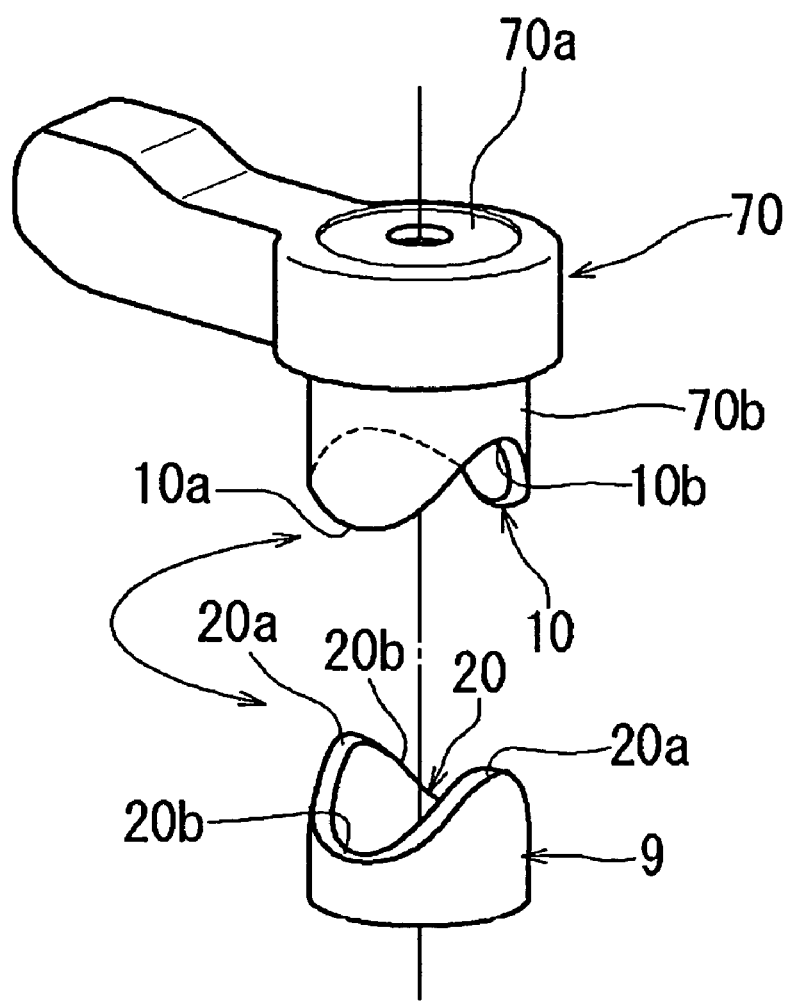
FIG. 8 is a schematic exploded perspective view of an operating knob and a receiving base.

Referring to FIG. 8, the operating knob 70 is in the form of a handle lever and comprises a cap-shaped boss section 70a, a substantially cylindrical section 70b coaxial with the boss section 70a and extending axially from the boss section 70a, and a lever section extending radially from the boss section 70a. As shown in FIG. 7, the operating knob 70 is rotatably mounted on the pin holder 5 with the substantially cylindrical section 70b facing the receiving base 9 and with a top portion of the boss section 70a being attached to the outer end portion 4c of the locking pin 4 by means of a screw 8.

The recliner device further includes cooperating cam surface means on the operating knob 70 and the receiving base 9. As shown in FIG. 8, the cooperating cam surface means comprises a first cam surface 10 on a circumferential edge portion of the substantially cylindrical section 70b of the operating knob 70 which is opposed to or faces a circumferential edge portion of the ring-shaped receiving base 9, and a second cam surface 20 on the circumferential edge portion of the ring-shaped receiving base 9. The first and second cam surfaces have the substantially same shape. More particularly, the first cam surface 10 of the substantially cylindrical section 70b of the operating knob 70 comprises first two opposite crest portions 10a spaced apart from each other at intervals of about 180 degrees around the circumferential edge portion of the substantially cylindrical section 70b, and first two opposite valley portions 10b each disposed between the first crest portions 10a and continuously connected to the first crest portions 10a. Similarly, the second cam surface 20 of the ring-shaped receiving base 9 comprises second two opposite crest portions 20a spaced apart from each other at intervals of about 180 degrees around the circumferential edge portion of the ring-shaped receiving base 9, and second opposite valley portions 20b each disposed between the second crest portions 20*a* and continuously connected to the second crest portions 20*a*.

Figure 9:
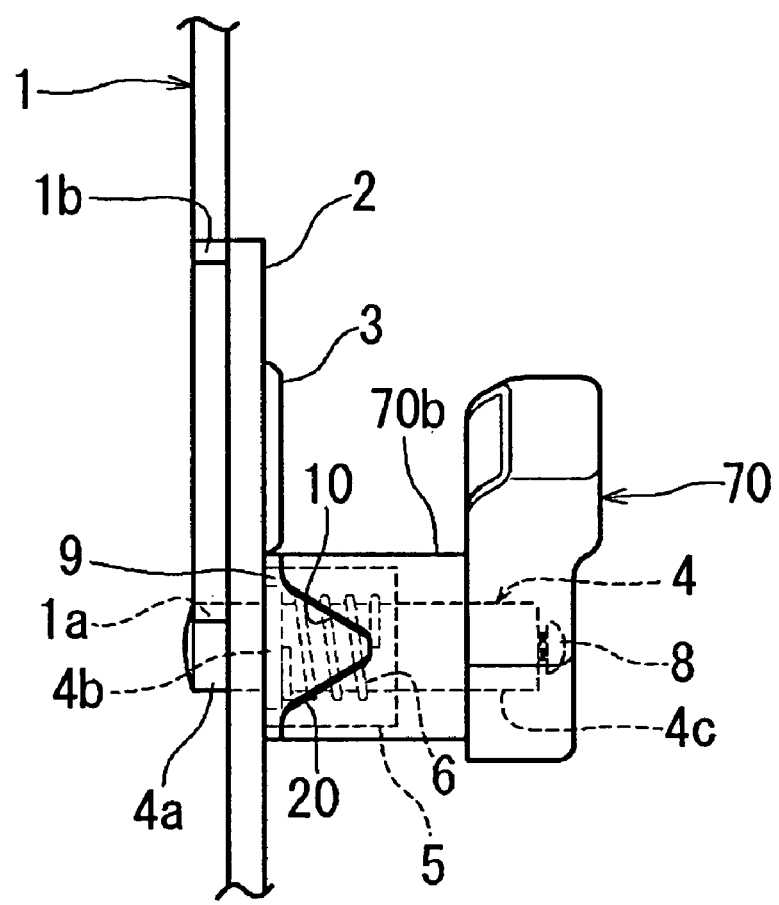
FIG. 9 is a schematic side view of the recliner device of FIG. 6 in a usual condition.

Referring to FIG. 9, the first crest portions 10*a* of the first cam surface 10 and the second crest portions 20*a* of the second cam surface 20 are always engaged with the second valley portions 20*b* and the first valley portions 10*a*, respectively and the locking pin 4 is always engaged with any one of the notches 1*a*-1*c*, due to the action of the coil spring 6. Thus, the seat back is selectively kept in the vertically standing posture, the forwardly inclined posture or the rearwardly inclined posture relative to the seat cushion. Incidentally, the attitude of the seat back is determined by a notch of the first bracket with which the locking pin is engaged. The operating knob 70 is adapted to be rotatable in both a clockwise direction and a counterclockwise direction.

Figure 10:
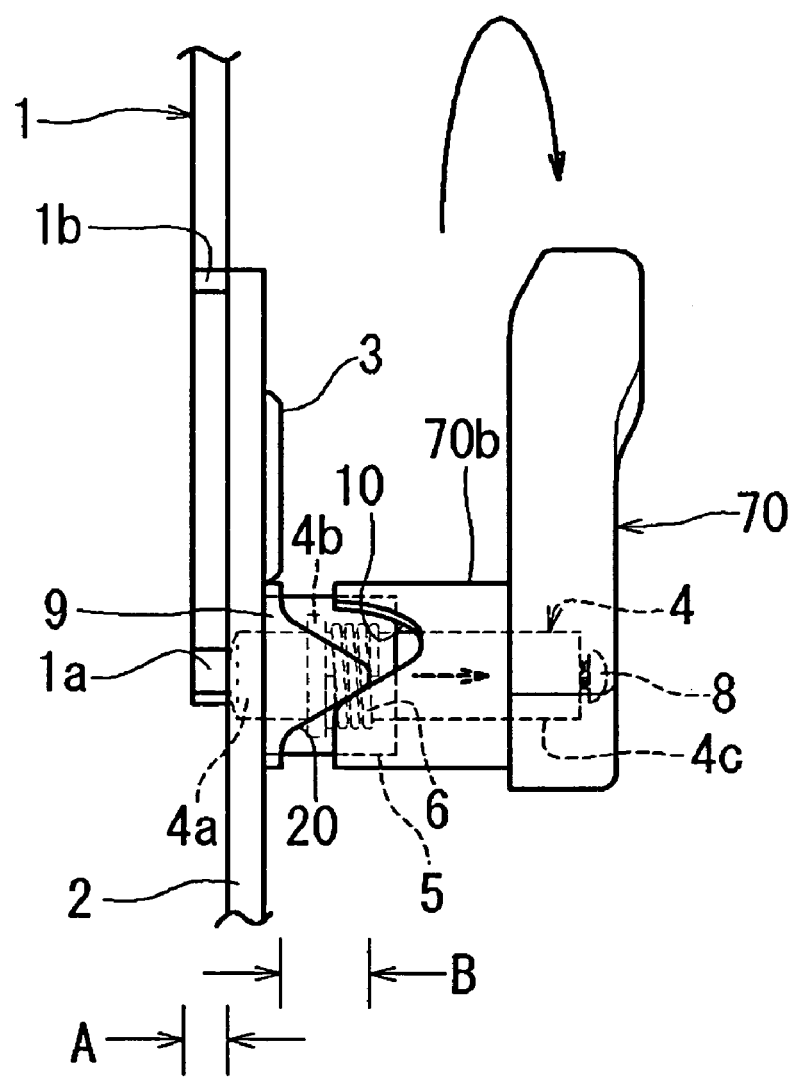
FIG. 10 is a schematic side view of the recliner device of FIG. 6 in an operated state.

When the person causes the operating knob 70 to be rotated around the pin-holder 5 in the clockwise direction or the counterclockwise direction while gripping the lever section of the operating knob 70, the first crest portions 10*a* of the operating knob 70 and the second crest portions 20*a* of the ring-shaped receiving base 9 are shifted from the second valley portions 20*b* and the first valley portions 10*b* as shown in FIG. 10, respectively, whereby the locking pin 4 is axially moved away from the first bracket 1 against the action of the coil spring 6 and then disengaged from the one of the notches 1*a*-1*c* of the first bracket 1 with which the locking pin 4 has been engaged until now. Thus, the seat back is brought into a pivotable condition relative to the seat cushion. Incidentally, each of the first and second crest portions 10*a*, 20*a* has a height enough to allow the locking pin 4 to be axially moved and then disengaged from the notches 1*a*-1*c* of the first bracket 1. Therefore, both the clockwise directional movement of the operating knob and the counterclockwise directional movement of the operating knob can cause the locking pin 4 to be positively disengaged from the notches 1*a*-1*c*.

As discussed above, the disengaging of the locking pin 4 from the notches 1*a*-1*c* of the first bracket 1 can be easily performed by merely causing the operating knob 70 to be rotated around the pin-holder 5. Therefore, even if the person who handles the operating knob 70 is physically weak, the person can easily operate the operating knob 70. Thus, the recliner device according to the present invention ensures that persons in a broad age-group including aged persons and children easily handle the operating knob.

A stroke of the locking pin 4 causes the coil spring 6 to be contracted and causes the locking pin 4 to be disengaged from the one of the notches 1*a*-1*c* of the first bracket 1. As shown in FIG. 10, a height B of each of the crest portions 10*a*, 20*a* of the cam surfaces 10, 20 may be set so as to be larger than a stroke distance A of the locking pin 4, so that the rotational movement of the operating knob 70 is limited. The operating knob 70 can be rotated in both the clockwise direction and the counterclockwise direction because of the shapes of the first and second cam surfaces 10, 20. Therefore, the operating knob may be constructed as a type of operating knob that is drawn up and then rotated or is pushed down and then rotated.

When the lever section of the operating knob 70 is released from the person's hand after changing of the attitude of the seat back relative to the seat cushion is performed, the locking pin 4 is automatically moved toward the lower edge portion of the first bracket 1 due to the action of the coil spring 6 while causing the operating knob 70 to be returned to its original condition in which the first crest portions 10*a* of the first cam surface 10 and the first valley portions 10*b* of the first cam surface 10 are engaged with the second valley portions 20*b* of the second cam surface 20 and the second crest portions 10*a* of the first cam surface 10, respectively. The locking pin 4 is then operatively engaged with one of the notches 1*a*-1*c* of the first bracket 1 which corresponds to the changed attitude of the seat back. Thus, the seat back is maintained in the changed attitude.

Figure 11:
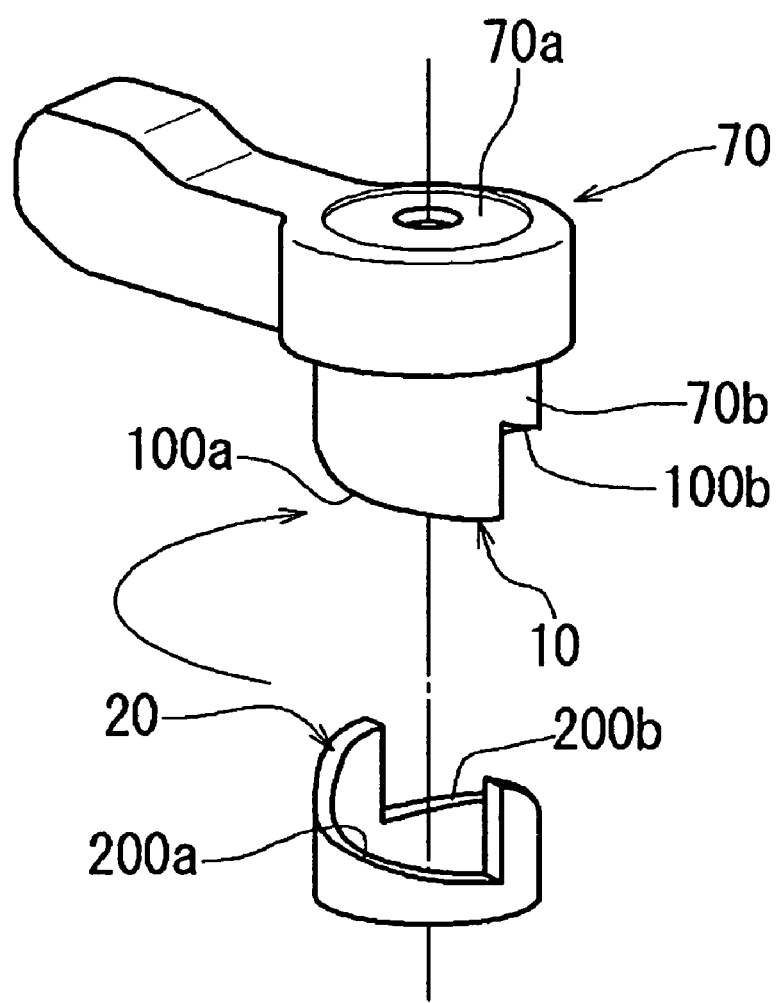
FIG. 11 is a schematic exploded perspective view illustrating a modification of the recliner device of FIG. 6.

Referring to FIG. 11, there is illustrated a modification of the cooperating cam surface means shown in FIGS. 8 to 10. In this modification, the first cam surface 10 of the cylindrical section 70*b* of the operating knob 70 comprises first and second axially extending surfaces spaced at about 180° around the circumferential edge portion of the substantially cylindrical section 70*b* of the operating knob 70 which faces the circumferential edge portion of the ring-shaped receiving base 9, a first circumferentially sloping surface 100*a* descending from a tip edge of the first axially extending surface to a root point of the second axially extending surface, and a second circumferentially sloping surface 100*b* descending from a tip edge of the second axially extending surface to a root point of the first axially extending surface. Similarly the second cam surface 20 comprises third and fourth axially extending surfaces spaced at about 180° around the circumferential edge portion of the ring-shaped receiving base 9, a third circumferentially sloping surface 200*a* descending from a tip edge of the third axially extending surface to a root point of the fourth axially extending surface, and a fourth circumferentially sloping surface 200*b* descending from a tip edge of the fourth axially extending surface to a root point of the third axially extending surface. Due to the action of the coil spring, the first circumferentially sloping surface portion 100*a* and the second circumferentially sloping surface portion 100*b* of the operating knob 70 are always engaged with the third circumferentially sloping surface portion 200*a* and the fourth circumferentially sloping surface portion 200*b* of the receiving base 9, respectively, and the first axially extending surface and the second axially extending surface are always engaged with the fourth axially extending surface and the third axially extending surface, respectively. Thus, in this modification, the operating knob 70 is constructed as a unidirectional operating knob. When the operating knob 70 is rotated in a direction indicated in FIG. 11 by an arrow, the first sloping surface portion 100*a* and the second sloping surface portion 100*b* are shifted from the third sloping surface portion 200*a* and the fourth sloping surface portion 200*b*, respectively, and the first axially extending surface and the second axially extending surface are disengaged from the fourth axially extending surface and the third axially extending surface, respectively, whereby the locking pin is moved away from the first bracket against the action of the coil spring and disengaged from the one of the notches of the first bracket with which the locking pin has been engaged till now. A length of each of the first, second, third and fourth axially extending surface is set so as to be larger than a stroke distance of the locking pin, so that the rotational movement of the operating knob is limited.

Figure 12:
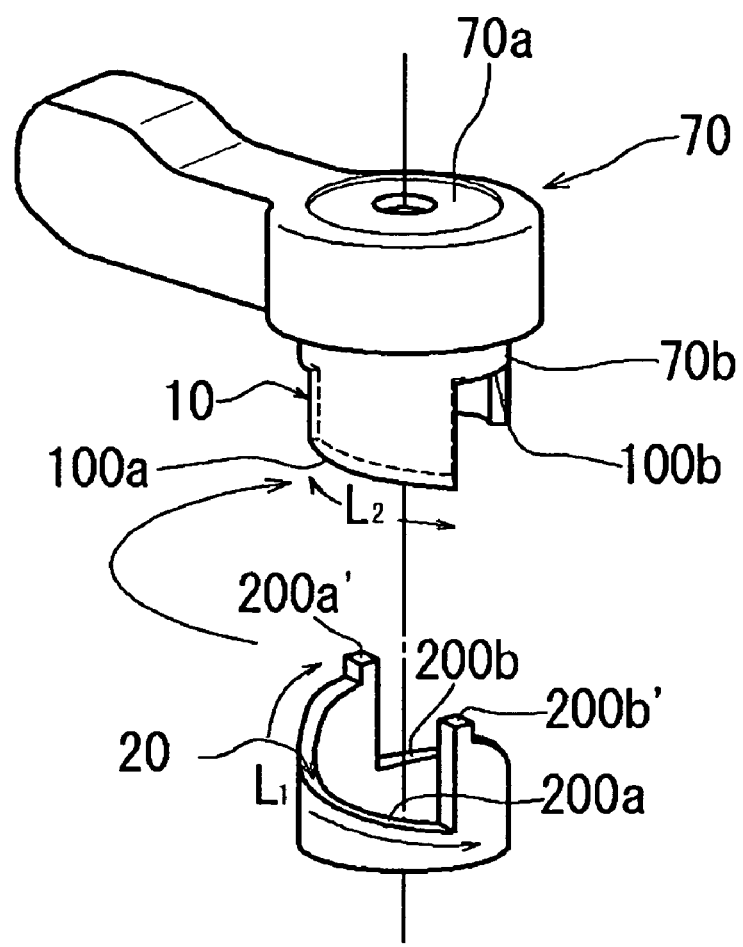
FIG. 12 is a schematic exploded perspective view showing another modification of the recliner device of FIG. 6.

Referring to FIG. 12, there is illustrated another modification of the cooperating cam surface means. Like the modification of FIG. 11, this modification includes the first circumferentially sloping surface portion 100*a* descending from the tip edge of the first axially extending surface to the root point of the second axially extending surface, the second circumferentially sloping surface 100*b* descending from the tip edge of the second axially extending surface to the root point of the first axially extending surface, the third circumferentially sloping surface portion 200*a* descending from the tip edge of the third axially extending surface to the root point of the fourth axially extending surface, and the fourth circumferentially sloping surface portion 200b descending from the tip edge of the fourth axially extending surface to the root point of the third axially extending surface. In the modification of FIG. 12, the third axially extending surface and the fourth axially extending surface of the receiving base 9 are provided at their tip edges with stopper projections 200a', 200b'. A length $L_2$ of each of the first and second circumferentially sloping surfaces 100a, 100b of the operating knob 70 is shorter than that $L_1$ of each of the third and fourth circumferentially sloping surfaces 200a, 200b of the receiving base 9. Like the operating knob of FIG. 11, the operating knob 70 of FIG. 12 is constructed as a unidirectional knob.

In the modification of FIG. 12, the length $L_2$ of each of the first and second circumferentially sloping surfaces 100a, 100b of the operating knob 70 is shorter than that $L_1$ of each of the third and fourth circumferentially sloping surfaces 200a, 200b of the receiving base 9 as discussed above, each of the first, second, third and fourth circumferentially sloping surfaces 100a, 100b, 200a, 200b has a slope enough to allow the locking pin to be disengaged from any one of the notches of the first bracket. Further, as discussed above, the third axially extending surface and the fourth axially extending surface of the receiving base 9 are provided at their tip edges with the stopper projections 200a', 200b'. Therefore, when the operating knob 70 is rotated in a direction indicated in FIG. 12 by an arrow and the first and second circumferentially sloping surfaces 100a, 100b of the operating knob 70 are shifted from the third and fourth circumferentially sloping surfaces 200a, 200b of the receiving base 9, the first and second axially extending surfaces of the operating knob 70 are abutted against the stopper projections 200a', 200b' of the receiving base 9, whereby the rotational movement of the operating knob 70 is restricted. Incidentally, the shape of the first cam surface 10 of the operating knob 70 and the shape of the second cam surface 20 of the receiving base 9 may be reversed.

Figure 13:
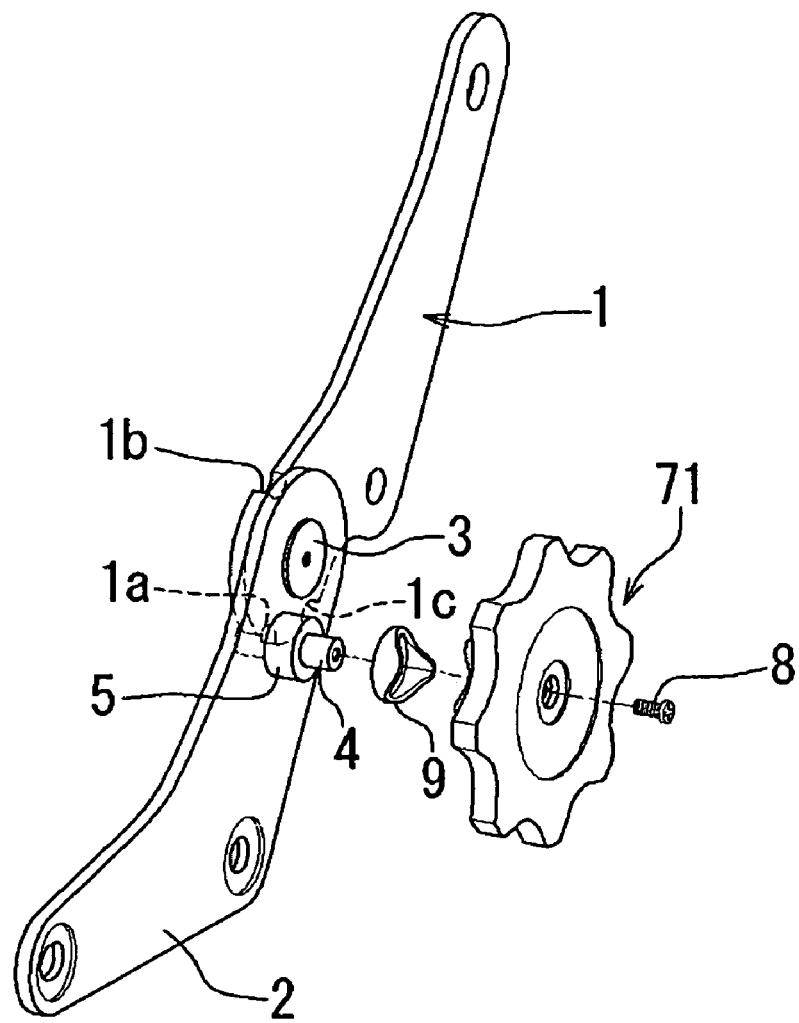
FIG. 13 is a schematic exploded perspective view illustrating a recliner device in which a dial-type operating knob is employed in lieu of the operating knob shown in FIG. 6.

In the illustrated examples of FIGS. 6 to 12, the operating knobs 70 are of types of handle levers. In lieu of the handle lever type-knobs 70, such a dial-type operating knob 71 as shown in FIG. 13 may be employed. In this case, a side of the dial-type operating knob 71 which is opposed to or faces the receiving base 9 is provided with a first cam surface which is constructed in the same manner as the first cam surfaces 10 of FIGS. 8 to 10, FIG. 11 or FIG. 12 is done, and is engaged with the second cam surface of the receiving base 9.

In the above-discussed examples, the first bracket 1 is arranged on the inside of the second bracket 2. Alternatively, the first bracket 1 may be arranged on the outside of the second bracket 2. In this case, the locking pin is penetrated through the first bracket 1 and projected toward the second bracket 2, and the engaging notches with which the locking pin is to be engaged are provided around the rear end portion of the second bracket 2.

Furthermore, bearing pieces (not shown) for bearing the inner end portion of the locking pin may be provided at edge areas of the end portion of the inner bracket which are adjacent the notches that are formed in the inner bracket. More particularly, the bearing pieces have shallow V-shaped notches and are arranged at the circumferential edge areas of the end portion of the inner bracket 1 with the shallow V-shaped notches facing the notches of the inner bracket. In this case, the inner end portion of the locking pin can be stably born between the notches of the bearing pieces and the notches of the inner bracket.

As discussed above, in the recliner device according to the first embodiment of the present invention, the substantially ring-shaped receiving base is fixed on the outer bracket, the pin holder is mounted in the substantially ring-shaped receiving base and fixed on the outer bracket, the locking pin is penetrated though the pin holder and the outer bracket, and always projected toward the inner bracket due to the action of the coil spring, and the operating knob is mounted to the outer end portion of the locking pin with the substantially cylindrical section thereof being rotatably mounted on the pin holder and with the end portion of the substantially cylindrical section thereof facing the receiving base. Due to the action of the coil spring, the locking pin is releasably engaged with any one of the notches formed in the inner bracket. The mating cam surfaces are formed on the side of the cylindrical section of the operating knob and the side of the receiving base which are opposed to each other. The mating cam surfaces include the crest portions having heights enough to allow the axial movement of the locking pin. When the person causes the operating knob to be rotated around the pin holder while gripping the lever section of the operating knob, the crest portions of the cam surface of the operating knob are shifted from the valley portions of the cam surface of the receiving base, whereby the locking pin is axially moved and then positively disengaged from the one of the notches of the inner bracket with which the locking pin has been engaged until now. Therefore, persons in a broad age-group including physically weak persons such as aged persons and children can easily handle the operating knob and easily cause the locking pin to be disengaged from the one of the notches of the inner bracket.

Further, in the recliner device of FIGS. 6 to 10, the first cam surface of the operating knob comprises the first and second crest portions spaced apart from each other around the circumferential edge portion of the substantially cylindrical section which is opposed to or faces the circumferential edge portion of the substantially ring-shaped receiving base, and the first and second valley portions each disposed between the first and second crest portions and continuously connected to the first and second crest portions. Similarly, the second cam surface of the substantially ring-shaped receiving base comprises the third and fourth crest portions spaced apart from each other around the circumferential edge portion of the substantially ring-shaped receiving base, and the third and fourth valley portions each disposed between the third and fourth crest portions and continuously connected to the third and fourth crest portions. Because of the shapes of the first and second cam surfaces, the operating knob can be rotated in both the clockwise direction and the counterclockwise direction. Therefore, the operating knob may be constructed as a type of operating knob that is drawn up and then rotated or is pushed down and then rotated.

Furthermore, in the recliner device of FIG. 11, the first cam surface of the operating knob comprises the first and second axially extending surfaces spaced at about 180° around the circumferential edge portion of the substantially cylindrical section which faces the circumferential edge portion of the ring-shaped receiving base, the first circumferentially sloping surface descending from the tip edge of the first axially extending surface to the root point of the second axially extending surface, and the second circumferentially sloping surface descending from the tip edge of the second axially extending surface to the root point of the first axially extending surface. Similarly, the second cam surface of the ring-shaped receiving base comprises the third and fourth axially extending surfaces spaced at 180° around the circumferential edge portion of the ring-shaped receiving base, the third circumferentially sloping surface descending from the tip edge of the third axially extending surface to the root point of the fourth axially extending surface, and the fourth circumferentially sloping surface descending from the tip edge of the fourth axially extending surface to the root point of the third axially extending surface. Because of the shapes of the first and second cam surfaces of the recliner device of FIG. 11, the operating knob of FIG. 11 can be constructed as a unidirectional knob.

Furthermore, in the recliner device of FIG. 12, the third axially extending surface and the fourth axially extending surface of the receiving base are provided at their tip edges with the stopper projections, and the length of each of the first and second circumferentially sloping surfaces of the operating knob is shorter than that of each of the third and fourth circumferentially sloping surfaces of the receiving base. Therefore, the operating knob of FIG. 12 can be constructed as a unidirectional knob. In addition, the rotational movement of the operating knob around the pin holder can be positively restricted by the stopper projections.

Referring to FIGS. 14 to 20, there is illustrated a recliner device according to a second embodiment of the present invention. The second embodiment is substantially similar to the first embodiment except that a receiving base different from the receiving base of the first embodiment is employed, and engaging means for causing the cylindrical section of the operating knob and the receiving base to be engaged with each other is employed.

Figure 14:
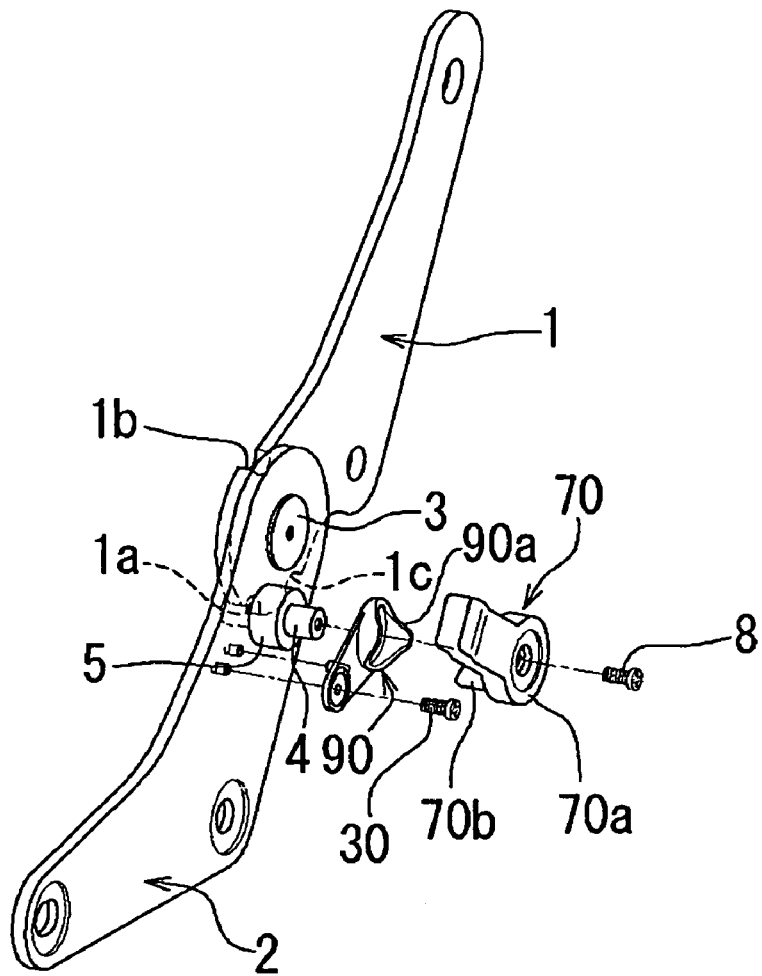
FIG. 14 is a schematic exploded perspective view of a recliner device according to a second embodiment of the present invention.

As shown in FIG. 14, a first bracket 1 extending downward from a side of a seat back (not shown) is employed as an inner bracket and a second bracket 2 extending rearward from a side of a seat cushion (not shown) is employed as an outer bracket. The first bracket 1 is pivotally connected to the second bracket 2 by causing a lower end portion of the first bracket 1 to be overlapped on an inner surface of a rear end portion of the second bracket 2 and causing the lower end portion of the first bracket 1 to be pivotally connected to the rear end portion of the second bracket 2 by a supporting pin 3.

Like the seat back shown in FIG. 1, the seat back of the second embodiment can be pivoted around the supporting pins in such a manner that the attitude of the seat back is selectively changed to a vertically standing posture, a forwardly inclined posture or a rearwardly inclined posture. A locking pin 4 is penetrated through the rear end portion of the second bracket 2 so as to be axially movable and projected toward a lower edge of the first bracket 1. The lower end portion of the first bracket 1 is formed into a substantially semicircular shape and has three semicircular-shaped, spaced apart notches 1a, 1b, 1c formed around a circumferential edge thereof. An inner end portion 4a of the locking pin 4 is releasably engaged with any one of the notches 1a-1c, whereby the seat back is locked in the vertically standing posture, the forwardly inclined posture or the rearwardly inclined posture relative to the seat cushion.

Figure 15:
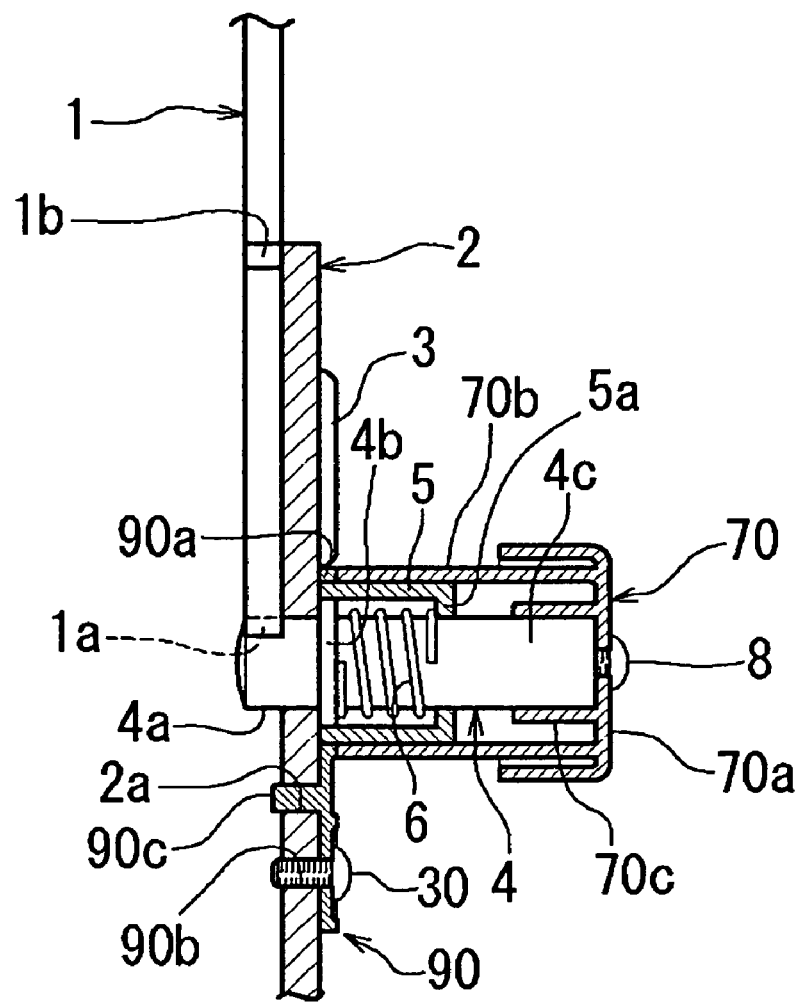
FIG. 15 is a schematic sectional view of the recliner device of FIG. 14 in an assembled condition.

Referring to FIG. 15, a receiving base 90 having a substantially ring-shaped receiving section 90a is fixed on an outer surface of the rear end portion of the second bracket 2 with the ring-shaped receiving section 90a surrounding the locking pin 4. A pin-holder 5 of a substantially cylindrical shape is mounted in the ring-shaped receiving section 90a of the receiving base 90 so as to surround the locking pin 4, and fixed on the outer surface of the rear end portion of the second bracket 2. An outer end portion 4c of the locking pin 4 is penetrated through the pin-holder 5 and projects outwardly from the pin-holder 5. The pin-holder 5 has an inwardly facing circumferential flange portion 5a. The locking pin 4 is provided with a circumferential flange 4b. A coil spring 6 is mounted around the locking pin 4 and disposed between the circumferential flange 4b of the locking pin 4 and the inwardly facing circumferential flange portion 5a of the pin-holder 5, whereby the locking pin 4 is always urged in such a direction as to be operatively engaged with the engaging notches 1a to 1c of the first bracket 1. A cap-shaped boss section 70a of an operating knob 70 which will be discussed in greater detail hereinafter is secured to the outer end portion 4c of the locking pin 4 by a screw 8.

Figure 16:
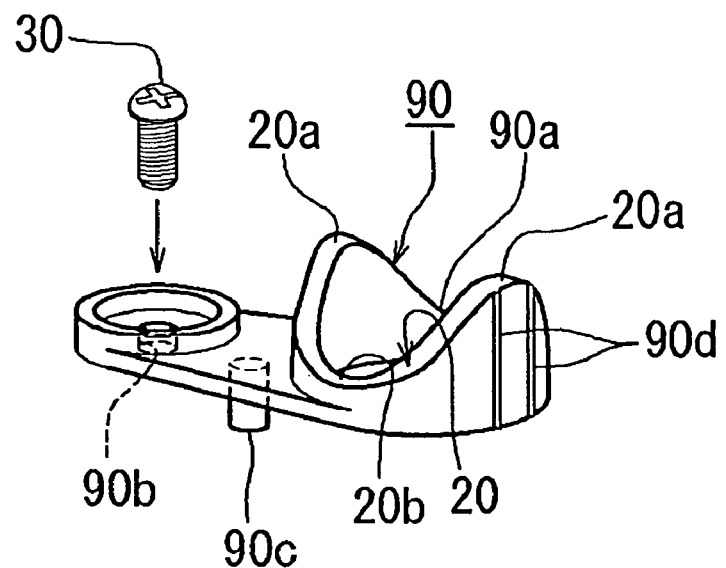
FIG. 16 is a schematic perspective view illustrating a receiving base of the recliner device shown in FIG. 14.

As shown in FIG. 16, the receiving base 90 has a plate-shaped base body of a substantially elongated ellipse shape, at one end portion of which the ring-shaped receiving section 90a is provided. A fixing-hole 90b is formed in the other end portion of the base body. As shown in FIG. 15, the receiving base 90 is mounted on the outer surface of the second bracket 2 by causing a screw 30 to be inserted into the fixing-hole 90b and causing the receiving base 90 to be secured to the second bracket 2 using the screw 30. The base body further has a dowel 90c projecting from a back side of the base body of the receiving base 90. The dowel 90c of the receiving base 90 is fitted in a dowel hole 2a formed in the second bracket 2, whereby the receiving base 90 is positioned with respect to the second bracket 2.

Figure 17:
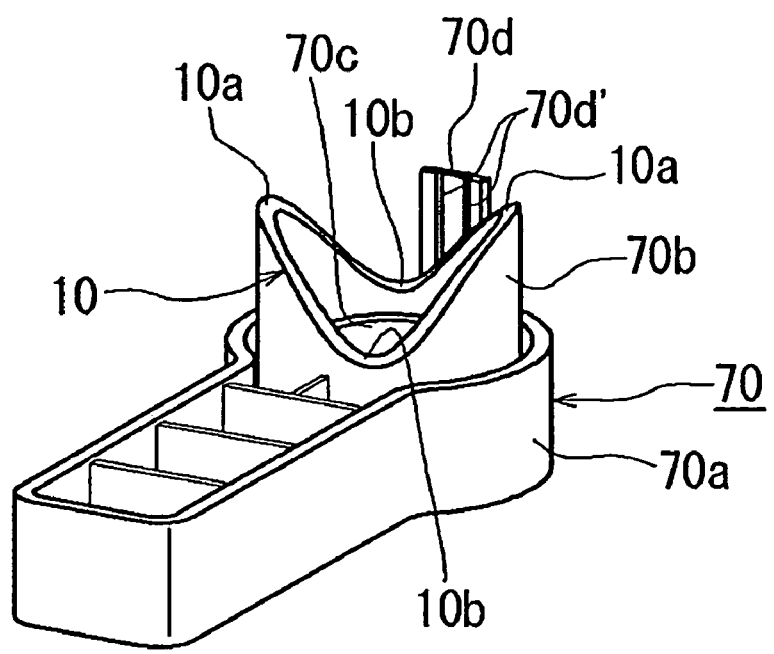
FIG. 17 is a schematic perspective view illustrating an operating knob of the recliner device shown in FIG. 14.

As shown in FIG. 17, the operating knob 70 is in the form of a handle lever and comprises the cap-shaped boss section 70a briefly discussed above, a substantially cylindrical section 70b coaxial with the boss section 70a and axially extending from the boss section 70a, and a lever section extending radially from the boss section 70a. The substantially cylindrical section 70b has a receiving portion 70c provided therein for receiving the outer end portion 4c of the locking pin 4. The knob 70 is rotatably mounted on the pin-holder 5 with the boss section 70a being secured to the outer end portion 4c of the locking pin 4 by the screw 8 (see FIG. 14) as discussed above and with the substantially cylindrical section 70b being opposed to the receiving section 90a of the receiving base 90. The cap-shaped boss section 70a is provided with an elongated protruding piece 70d extending axially from the cap-shaped boss section 70a. The protruding piece 70d has two linear grooves 70d' formed in an inner surface thereof and extending along a longitudinal direction of the protruding piece 70d.

Figure 18:
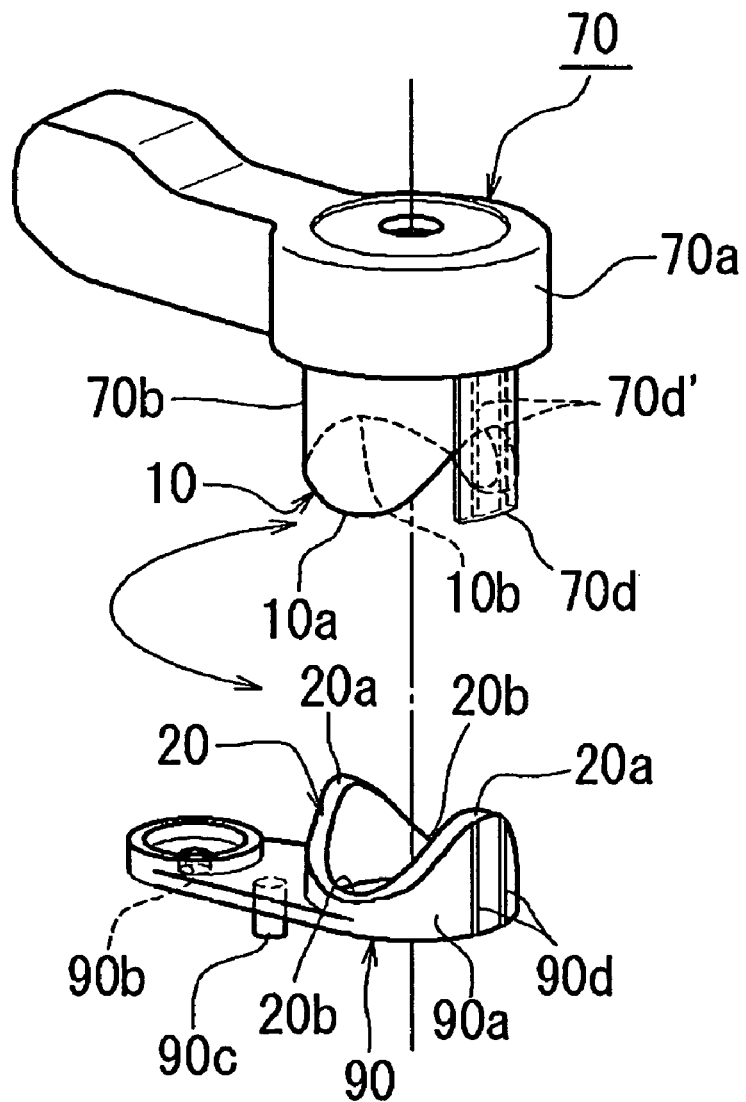
FIG. 18 is a schematic exploded perspective view showing the receiving base of FIG. 16 and the operating knob of FIG. 17 which are opposed to each other.

As shown in FIGS. 16 to 18, a first cam surface 10 is formed on a circumferential edge portion of the substantially cylindrical section 70b of the operating knob which is opposed to or faces a circumferential edge portion of the ring-shaped receiving portion 90a of the receiving base 90, and a second cam surface 20 is formed on the circumferential edge portion of the ring-shaped receiving portion 90a of the receiving base 90. The first cam surface 10 of the substantially cylindrical section 70b of the operating knob 70 comprises first spaced apart opposite crest portions 10a and first valley portions 10b disposed between the first crest portions 10 and continuously connected to the first crest portions 10a. Similarly, the second cam surface 20 of the ring-shaped receiving portion 90a of the receiving base 90 comprises second spaced apart opposite crest portions 20a and second valley portions 20b disposed between the second crest portions 20a and continuously connected to the second crest portions 20a. One of the crest portions 20a has two vertically extending projections 90d (see FIG. 16) provided on an outer surface thereof. In a condition where the inner portion 4a of the locking pin 4 is engaged with any one of the notches 1a-1c of the first bracket 1, the first crest portions 10a of the operating knob 70 and the second crest portions 20a of the receiving base 90 are engaged with the second valley portions 20b of the receiving base 90 and the first valley portions 10a of the operating knob 70, respectively, and the grooves 70d' of the operating knob 70 are engaged with the projections 90d of the receiving base 90. Incidentally, while the grooves 70d' are formed in the protruding piece 70d of the operating knob 70 and the projections 90d are provided on the receiving portion 90a of the receiving base 90 in the illustrated example, the grooves 70d' may be formed in the receiving portion 90a of the receiving base 90 and the projections 90d may be provided on the protruding piece 70d. Furthermore, in the illustrated example, the number of the grooves 70d' is two and the number of the projections 90d is two. However, it will be understood that the number of the grooves 70d' and the number of the projections 90d are not limited to two, and may be at least one.

Figure 19:
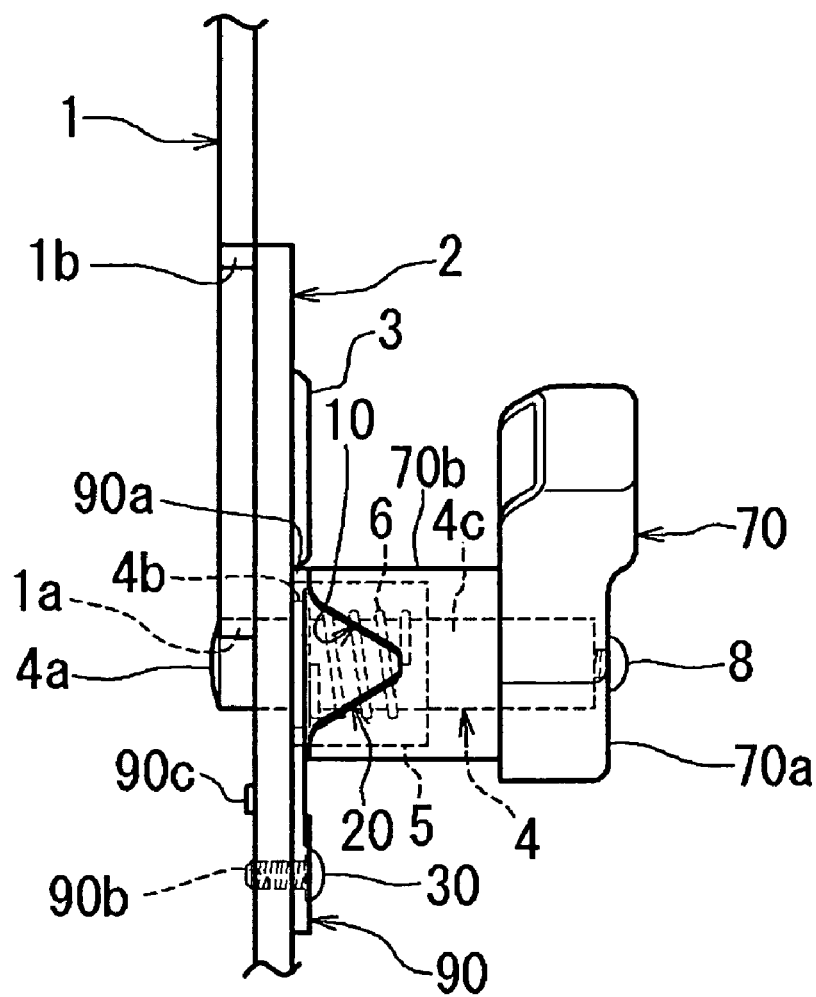
FIG. 19 is a schematic side view illustrating the recliner device of FIG. 14 in a usual state.

As shown in FIG. 19, the first crest portions 10a of the operating knob 70 and the first valley portions 10b of the operating knob 70 are usually engaged with the second valley portions 20b of the receiving base 90 and the second crest portions 20a of the receiving base 90, respectively, and the inner end portion 4a of the locking pin 4 is releasably engaged with any one of the notches 1a-1c of the first bracket 1 due to the action of the coil spring 6, whereby the seat back is maintained in the vertically standing posture, the forwardly inclined posture or the rearwardly inclined posture relative to the seat cushion.

When the person causes the operating knob 70 to be rotated in one of clockwise and counterclockwise directions while gripping the lever section of the operating knob 70 in order that the posture of the seat back is changed, the first crest portions 10a of the operating knob 70 and the first valley portions 10b of the operating knob 70 are shifted from the second valley portions 20b of the receiving base 90 and the second crest portions 20a of the receiving base 90, respectively, whereby the inner end portion 4a of the locking pin 4 is moved, against the action of the coil spring 6, away from the one of the notches 1a-1c with which the inner end portion 4a of the locking pin 4 has been engaged until now, and is then disengaged from the one of the notches 1a-1c. Incidentally, as discussed above, the grooves 70d' of the operating knob 70 are releasably engaged with the vertically extending projections 90d of the receiving base 90. When the operating knob 70 is rotated with the pin-holder 5 in one of the clockwise and counterclockwise directions by the person, the grooves 70d' of the operating knob 70 are disengaged from the projections 90d of the receiving base 90. Furthermore, when the operating knob 70 is released from the person's hand, the operating knob 70 is rotated in the opposite direction due to the action of the coil spring 6. The operating knob 70 is then rotated in the same direction by the person's hand, whereby the grooves 70d' of the operating knob 70 are again engaged with the projections 90d of the receiving base 90 while producing clicking sounds. The engagement of the grooves 70d' with the projections 90d ensures that the person can make sure that the locking pin 4 is projected toward the edge of the lower end portion of the first bracket 1 and engaged with any one of the notches 1a-1c of the first bracket 1.

As discussed above, by the rotation of the operating knob 70, the first crest portions 10a of the first cam surface 10 of the operating knob 70 and the first valley portions 10b of the first cam surface 10 of the operating knob 70 are shifted from the second valley portions 20b of the second surface 20 of the receiving base 90 and the second crest portions 20a of the second surface 20 of the receiving base 90, respectively, whereby the locking pin 4 can be moved away from the edge portion of the first bracket 1 and easily disengaged from the one of the notches 1a-1c of the first bracket 1. Therefore, even if persons who handle the recliner device are persons in a broad age-group including weak-armed persons such as aged persons and children, the persons can easily operate the operating knob.

Figure 20:
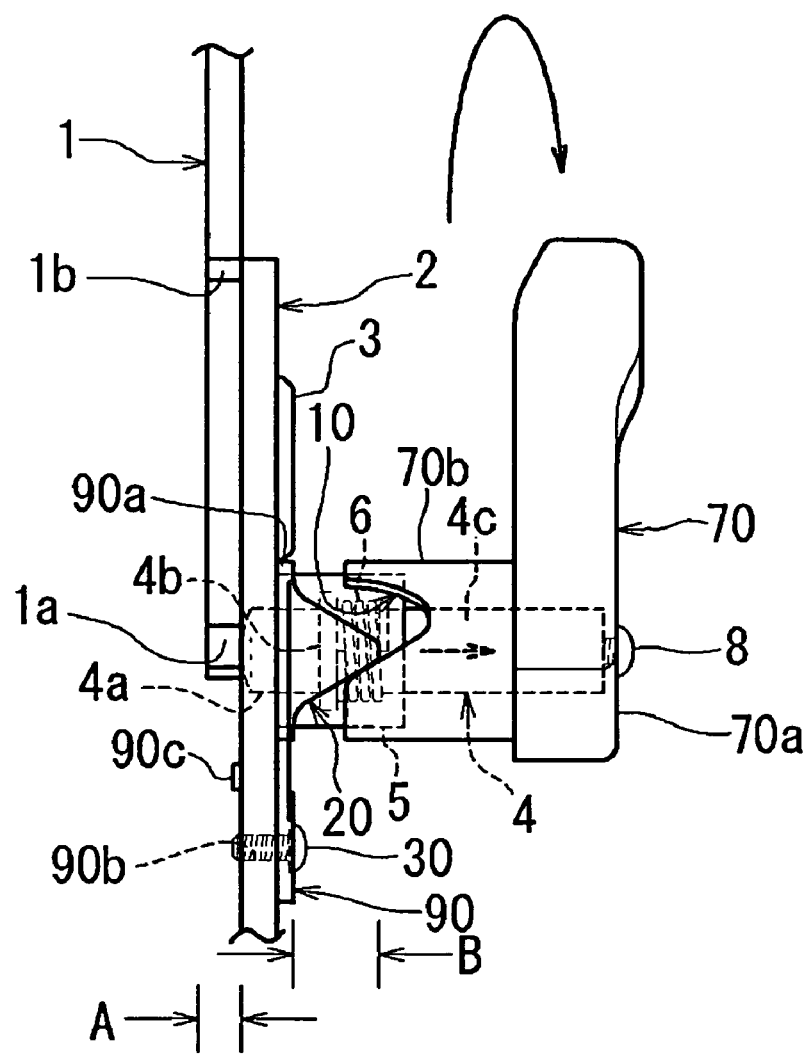
FIG. 20 is a schematic side view illustrating the recliner device of FIG. 19 in an operated condition.

As shown in FIG. 20, a stroke of the locking pin 4 causes the coil spring 6 to be contracted and causes the locking pin 4 to be disengaged from the one of the notches 1a-1c of the first bracket 1. A height B of each of the crest portions 10a, 20a of the cam surfaces 10, 20 is set so as to be larger than a stroke distance A of the locking pin 4, so that the rotational movement of the operating knob 4 is limited. The operating knob 70 can be rotated in both the clockwise direction and the counterclockwise direction because of the shapes of the first and second cam surfaces 10, 20. Therefore, the operating knob can be constructed as a type of operating knob that is drawn up and then rotated or pushed down and then rotated.

When the operating knob 70 is released from the person's hand after changing of the attitude of the seat back relative to the seat cushion is carried out by causing the seat back to be pivoted relative to the seat cushion by the person's hand, the locking pin 4 is operatively projected toward the edge of the lower end portion of the first bracket 1 and the inner end portion 4a of the locking pin 4 is then operatively engaged with any one of the notches 1a-1c of the first bracket 1, whereby the attitude of the seat back is kept changed. At this time, by causing the grooves 70d' of the operating knob 70 to be engaged with the projections 90d of the receiving base 90 by rotating the operating knob 70, the person can make sure that the inner end portion 4a of the locking pin 4 is positively engaged with any one of the notches 1a-1c.

Figure 21:
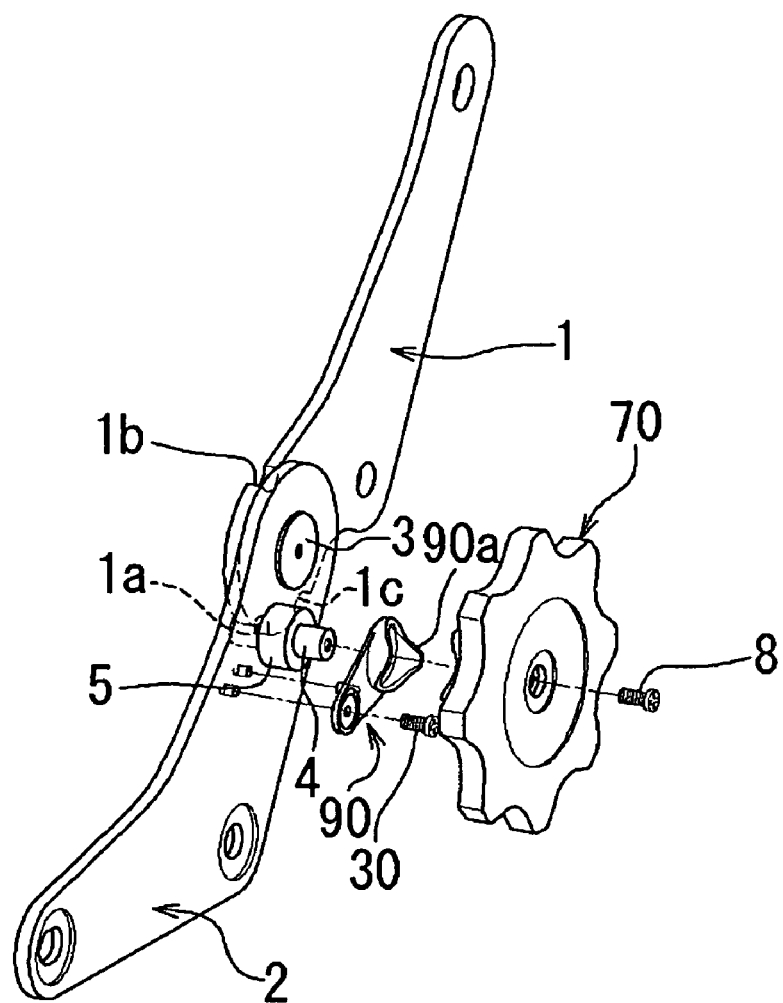
FIG. 21 is a schematic exploded perspective view illustrating a recliner device in which a dial-type operating knob is employed in lieu of an operating knob of the recliner device shown in FIG. 14.

While the handle-type operating knob 70 is employed in the second embodiment of the present invention, a dial-type operating knob 71 shown in FIG. 21 may be employed. In this case, a side of the dial-type operating knob 71 which is opposed to or faces the ring-shaped receiving portion 90a of the receiving base 90 is provided with a first cam surface which is formed in the same manner as the first cam surface 10 of FIG. 17 is done, and is releasably engaged with the second cam surface of the receiving base 90.

In the second embodiment, the first bracket 1 is arranged on the inside of the second bracket 2 as shown in FIG. 15. Alternatively, the first bracket 1 may be arranged on the outside of the second bracket 2. In this case, the locking pin is penetrated through the first bracket 1 and projected toward the second bracket 2, and the engaging notches with which the locking pin is to be engaged are provided around the rear end portion of the second bracket 2.

Furthermore, bearing pieces (not shown) for bearing the inner end portion of the locking pin may be provided at edge areas of the end portion of the inner bracket which are adjacent the notches that are formed in the inner bracket. More particularly, the bearing pieces have shallow V-shaped notches and are arranged at the circumferential edge areas of the end portion of the inner bracket 1 with the shallow V-shaped notches facing the notches of the inner bracket. In this case, the inner end portion of the locking pin can be stably born between the notches of the bearing pieces and the notches of the inner bracket.

As discussed above, in the recliner device according to the second embodiment of the present invention, the plate-shaped receiving base is fixed on the outer bracket with the substantially ring-shaped receiving portion thereof surrounding the locking pin, the pin holder is mounted in the substantially ring-shaped receiving base and fixed on the outer bracket, the outer end portion of the locking pin projects outwardly from the pin holder, the inner end portion of the locking pin always projects toward the edge of the end portion of the inner bracket due to the action of the coil spring, and the operating knob is mounted on the outer end portion of the locking pin with the substantially cylindrical section thereof being rotatably mounted on the pin holder and with the end portion of the substantially cylindrical section thereof facing the receiving base. The locking pin is releasably engaged with any one of the notches formed in the inner bracket, by the action of the coil spring. The mating cam surfaces are formed on the side of the cylindrical section of the operating knob and the side of the receiving base which are opposed to or face each other. The mating cam surfaces include the crest portions having heights enough to allow the axial movement of the locking pin. When the person causes the operating knob to be rotated around the pin holder while gripping the lever section of the operating knob, the crest portions of the cam surface of the operating knob are shifted from the valley portions of the cam surface of the receiving base, whereby the locking pin is axially moved and then positively disengaged from the one of the notches of the inner bracket with which the locking pin has been engaged until now. Therefore, persons in a broad age-group including physically weak persons such as aged persons and children can easily handle the operating knob and easily cause the locking pin to be disengaged from the one of the notches of the inner bracket.

Furthermore, in the recliner device according to the second embodiment, the first cam surface of the operating knob comprises the first and second crest portions spaced apart from each other around the circumferential edge portion of the substantially cylindrical section which is opposed to or faces the circumferential edge portion of the substantially ring-shaped receiving base, and the first and second valley portions each disposed between the first and second crest portions and continuously connected to the first and second crest portions. Similarly, the second cam surface of the substantially ring-shaped receiving base comprises the third and fourth crest portions spaced apart from each other around the circumferential edge portion of the substantially ring-shaped receiving base, and the third and fourth valley portions each disposed between the third and fourth crest portions and continuously connected to the third and fourth crest portions. Because of the shapes of the first and second cam surfaces, the operating knob can be rotated in both the clockwise direction and the counterclockwise direction. Therefore, the operating knob may be constructed as a type of operating knob that is drawn up and then rotated or is pushed down and then rotated.

Furthermore, in the second embodiment of the present invention, the cap-shaped boss section is provided with the elongated protruding piece which extends axially from the cap-shaped boss section and has at least one linear groove formed in the inner surface of the protruding piece, and the one of the crest portions of the receiving base has at least one vertically extending projection. The at least one groove of the operating knob is releasably engaged with the at least one projection of the receiving base. In a condition where the groove of the operating knob is disengaged from the projection of the receiving base, when the operating knob is returned to its original position due to the action of the coil spring and the person then rotates the operating knob in such a direction as to cause the groove of the operating knob to be engaged with the projection of the receiving base, whereby the groove of the operating knob is again engaged with the projection of the receiving base while producing clicking sounds. Thus, the person can make sure that the locking pin is projected toward the edge of the lower end portion of the first bracket and positively engaged with any one of the notches of the first bracket.

Furthermore, in the second embodiment, the substantially plate-shaped base body of the receiving base has the dowel projecting from the back side of the base body of the receiving base, and the dowel of the receiving base is fitted in the dowel hole formed in the second bracket, whereby the receiving base is positively positioned with respect to the second bracket.

The terms and expressions which have been employed herein are used as terms of description, not of limitation. There is no intention in the use of such terms and expressions of excluding any equivalents of the features described or any portions thereof. It is recognized, however, that various modifications are possible within the scope of the invention claimed.

What is claimed is:

1. A recliner device for a vehicle seat,
   said vehicle seat comprising a seat back and a seat cushion;
   said recliner device comprising:
   a first bracket provided at a side of said seat back and extending downwardly from the side of said seat back;
   said first bracket having a lower end portion;
   a second bracket provided at a side of said seat cushion and extending rearwardly from said side of said seat cushion;
   said second bracket having a rear end portion;
   said first bracket being pivotally connected at said lower end portion thereof to said rear end portion of said second bracket by means of a supporting pin with said lower end portion thereof being overlapped on said rear end portion of said second bracket, whereby said seat back is pivotable around said supporting pin in such a manner that an attitude of said seat back is changed to a vertically standing posture, a forwardly inclined posture or a rearwardly inclined posture relative to said seat cushion;
   said lower end portion of said first bracket having spaced apart notches formed at a circumferential edge thereof so as to be coaxial with said supporting pin;
   a locking pin having an inner end portion and an outer end portion;
   said locking pin penetrating said rear end portion of said second bracket so as to be axially movable and protruding toward said circumferential edge of said lower end portion of said first bracket;
   a spring mounted around said locking pin for urging said locking pin toward said circumferential edge of said lower end portion of said first bracket and causing said inner end portion of said locking pin to be engaged with any one of said notches, to thereby allow said seat back to be maintained in said vertically standing posture, said forwardly inclined posture or said rearwardly inclined posture;
   a receiving base mounted on an outer surface of said rear end portion of said second bracket and coaxially surrounding said locking pin;
   said receiving base comprising a substantially ring-shaped receiving portion;
   an operating means mounted to said outer end portion of said locking pin so as to be opposed to said receiving base;
   said operating means comprising an operating knob having a substantially cylindrical section; and cooperating cam surface means on said substantially cylindrical section of said operating means and said substantially ring-shaped portion of said receiving base;

said cooperating cam surface means comprising a first cam surface formed on a circumferential edge of said substantially cylindrical section which is opposed to a circumferential edge of said substantially ring-shaped receiving portion, and a second cam surface formed on said circumferential edge of said substantially ring-shaped receiving portion;

said first cam surface comprising first and second crest portions spaced apart from each other around said circumferential edge of said substantially cylindrical section, and first and second spaced apart valley portions each being disposed between said first and second crest portions and continuously connected to said first and second crest portions;

said second cam surface comprising third and fourth crest portions spaced apart from each other around said circumferential edge of said substantially ring-shaped receiving portion, and third and fourth spaced apart valley portions each being disposed between said third and fourth crest portions and continuously connected to said third and fourth crest portions;

said first and second crest portions and said third and fourth crest portions being engaged with said third and fourth valley portions and said first and second valley portions, respectively, due to an action of said spring; and each of said crest portions having a height enough to allow said locking pin to be axially moved so as to be disengaged from said one of the said notches of said first bracket;

wherein when said operating means is rotated relative to said receiving base, said first and second crest portions and said third and fourth crest portions are shifted from said third and fourth valley portions and said first and second valley portions, respectively, so that said locking pin is axially moved away from said circumferential edge of said lower end portion of said first bracket and then disengaged from said one of said notches with which said inner end portion of said locking pin has been engaged until now, whereby said seat back is allowed to be pivoted around said supporting pin.

2. A recliner device according to claim 1, wherein said first and second crest portions are spaced apart from each other at intervals of about 180 degrees around said circumferential edge of said substantially cylindrical section, and said third and fourth crest portions are spaced apart from each other at intervals of about 180 degrees around said circumferential edge of said substantially ring-shaped portion.

3. A recliner device according to claim 1 or 2, wherein said first and second cam surfaces have the same shape.

4. A recliner device according to claim 1 or 2, wherein said receiving base comprises a substantially plate-shaped body, said substantially ring-shaped receiving portion being provided at said substantially plate-shaped body, said substantially plate-shaped body being fixed on said outer surface of said rear end portion of said second bracket with said ring-shaped receiving portion surrounding said locking pin, and wherein said operating knob has a boss portion coaxial with said substantially cylindrical section, said boss portion being provided with an axially protruding piece, one of an inner surface of said axially protruding piece and an outer surface of said ring-shaped receiving portion being formed with at least one linear groove, the other of said inner surface of said axially extending protruding piece and said outer surface of said ring-shaped receiving portion being provided with at least one projection, said at least one groove and said at least one projection being adapted to be releasably engaged with each other.

5. A recliner device according to claim 3, wherein said receiving base comprises a substantially plate-shaped body, said substantially ring-shaped receiving portion being provided at said substantially plate-shaped body, said substantially plate-shaped body being fixed on said outer surface of said rear end portion of said second bracket with said ring-shaped receiving portion surrounding said locking pin, and wherein said operating knob has a boss portion coaxial with said substantially cylindrical section, said boss portion being provided with an axially protruding piece, one of an inner surface of said axially protruding piece and an outer surface of said ring-shaped receiving portion being formed with at least one linear groove, the other of said inner surface of said axially extending protruding piece and said outer surface of said ring-shaped receiving portion being provided with at least one projection, said at least one groove and said at least one projection being adapted to be releasably engaged with each other.

6. A recliner device according to claim 4, wherein said plate-shaped body of said receiving base has a dowel provided on a back side thereof and projecting from said back side, and wherein said second bracket has a dowel hole formed in said rear end portion thereof, said dowel of said receiving base being fitted in said dowel hole of said second bracket.

7. A recliner device according to claim 5, wherein said plate-shaped body of said receiving base has a dowel provided on a back side thereof and projecting from said back side, and wherein said second bracket has a dowel hole formed in said rear end portion thereof, said dowel of said receiving base being fitted in said dowel hole of said second bracket.

8. A recliner device for a vehicle seat,
said vehicle seat comprising a seat back and a seat cushion;
said recliner device comprising:
a first bracket provided at a side of said seat back and extending downwardly from the side of said seat back;
said first bracket having a lower end portion;
a second bracket provided at a side of said seat cushion and extending rearwardly from said side of said seat cushion;
said second bracket having a rear end portion;
said first bracket being pivotally connected at said lower end portion thereof to said rear end portion of said second bracket by means of a supporting pin with said lower end portion thereof being overlapped on said rear end portion of said second bracket, whereby said seat back is pivotable around said supporting pin in such a manner that an attitude of said seat back is changed to a vertically standing posture, a forwardly inclined posture or a rearwardly inclined posture relative to said seat cushion;
said lower end portion of said first bracket having spaced apart notches formed at a circumferential edge thereof so as to be coaxial with said supporting pin;
a locking pin having an inner end portion and an outer end portion;
said locking pin penetrating said rear end portion of said second bracket so as to be axially movable and protruding toward said circumferential edge of said lower end portion of said first bracket;

a spring mounted around said locking pin for urging said locking pin toward said circumferential edge of said lower end portion of said first bracket and causing said inner end portion of said locking pin to be engaged with any one of said notches, to thereby allow said seat back to be maintained in said vertically standing posture, said forwardly inclined posture or said rearwardly inclined posture;

a receiving base of a substantially ring-shape mounted on an outer surface of said rear end portion of said second bracket and coaxially surrounding said locking pin;

an operating means mounted to said outer end portion of said locking pin so as to be opposed to said receiving base;

said operating means comprising an operating knob having a substantially cylindrical section; and cooperating cam surface means on said substantially cylindrical section of said operating means and said receiving base;

said cooperating cam surface means comprising a first cam surface formed on a circumferential edge of said substantially cylindrical section which is opposed to a circumferential edge of said substantially ring-shaped receiving base, and a second cam surface formed on said circumferential edge of said substantially ring-shaped receiving base;

said first cam surface comprising first and second axially extending surface portions spaced apart from each other around said circumferential edge of said substantially cylindrical section, a first circumferentially sloping surface portion descending from a tip edge of said first axially extending surface portion to a root point of said second axially extending surface portion, and a second circumferentially sloping surface portion descending from a tip edge of said second axially extending surface portion to a root point of said first axially extending surface portion;

said second cam surface comprising third and fourth axially extending surface portions spaced apart from each other around said circumferential edge of said ring-shaped receiving base, a third circumferentially sloping surface portion descending from a tip edge of said third axially extending surface portion to a root point of said fourth axially extending surface portion, and a fourth circumferentially sloping surface portion descending from a tip edge of said fourth axially extending surface portion to a root point of said third axially extending surface portion; and said first circumferentially sloping surface portion and said second circumferentially sloping surface portion being engaged with said third circumferentially sloping surface portion and said fourth circumferentially sloping surface portion, respectively, due to an action of said spring;

wherein when said operating means is rotated relative to said receiving base, said first circumferentially sloping surface portion and said second circumferentially sloping surface portion are shifted from said third circumferentially sloping surface portion and said fourth circumferentially sloping surface portion, respectively, so that said locking pin is axially moved away from said circumferential edge of said lower end portion of said first bracket and then disengaged from said one of said notches with which said inner end portion of said locking pin has been engaged until now, whereby said seat back is allowed to be pivoted around said supporting pin.

9. A recliner device according to claim 8, wherein said first and second axially extending surface portions are spaced apart from each other at intervals of about 180 degrees around said circumferential edge of said substantially cylindrical section, and said third and fourth axially extending surface portions are spaced apart from each other at intervals of about 180 degrees around said circumferential edge of said ring-shaped receiving base.

10. A recliner device according to claim 8 or 9, wherein said circumferentially sloping surface portions formed on one of said circumferential edge of said substantially cylindrical section and said circumferential edge of said substantially ring-shaped receiving base have lengths shorter than lengths of said circumferentially sloping surface portions formed on the other of said circumferential edge of said substantially cylindrical section and said circumferential edge of said substantially ring-shaped receiving base, said axially extending surface portions formed on the one of said circumferential edge of said substantially cylindrical section and said circumferential edge of said substantially ring-shaped receiving base being provided at their tip edges with stopper projections.

* * * * *